(12) United States Patent
Facchini et al.

(10) Patent No.: US 8,545,994 B2
(45) Date of Patent: *Oct. 1, 2013

(54) ELECTRODEPOSITED METALLIC MATERIALS COMPRISING COBALT

(75) Inventors: Diana Facchini, Toronto (CA); Francisco Gonzalez, Toronto (CA); Jonathan McCrea, Toronto (CA); Mike Uetz, Aurora (CA); Gino Palumbo, Toronto (CA); Klaus Tomantschger, Mississauga (CA); Nandakumar Nagarajan, Burlington (CA); Jared J. Victor, Toronto (CA); Uwe Erb, Toronto (CA)

(73) Assignee: Integran Technologies Inc., Ontario (CA)

( * ) Notice: Subject to any disclaimer, the term of this patent is extended or adjusted under 35 U.S.C. 154(b) by 371 days.

This patent is subject to a terminal disclaimer.

(21) Appl. No.: 12/785,520

(22) Filed: May 24, 2010

(65) Prior Publication Data

US 2010/0304179 A1 Dec. 2, 2010

Related U.S. Application Data

(63) Continuation-in-part of application No. 12/548,750, filed on Aug. 27, 2009, which is a continuation-in-part of application No. 12/476,424, filed on Jun. 2, 2009.

(51) Int. Cl.
| | |
|---|---|
| *B32B 3/02* | (2006.01) |
| *B32B 15/04* | (2006.01) |
| *C22C 19/07* | (2006.01) |
| *C25D 5/48* | (2006.01) |
| *C25D 3/12* | (2006.01) |

(52) U.S. Cl.
USPC .......... 428/687; 428/678; 428/679; 428/675; 428/668; 420/435; 205/222; 205/223; 205/269; 72/53; 216/100; 216/58; 216/83; 216/52

(58) Field of Classification Search
USPC .............. 428/615, 544, 687, 678, 679, 675, 428/668
See application file for complete search history.

(56) References Cited

U.S. PATENT DOCUMENTS

| | | | |
|---|---|---|---|
| 2,643,221 | A | 6/1953 | Brenner |
| 3,303,111 | A | 2/1967 | Peach |

(Continued)

FOREIGN PATENT DOCUMENTS

| | | |
|---|---|---|
| CA | 2562042 A1 | 6/2006 |
| CA | 2562042 C | 6/2006 |

(Continued)

OTHER PUBLICATIONS

F. Mueller, "Pulse Plating & Other Myths", Plating & Surface Finishing, pp. 54-55, Apr. 2000.

(Continued)

*Primary Examiner* — Michael La Villa
(74) *Attorney, Agent, or Firm* — Rankin Hill & Clark LLP

(57) ABSTRACT

An article includes an electrodeposited metallic material including Co with a minimum content of 75% by weight. The metallic material has a microstructure which is fine-grained with an average grain size between 2 and 5,000 nm and/or an amorphous microstructure. The metallic material forms at least part of an exposed surface of the article. The metallic material has an inherent contact angle for water of less than 90 degrees at room temperature when measured on a smooth exposed surface portion of the metallic material which has a maximum surface roughness Ra of 0.25 microns. The metallic material has an exposed patterned surface portion having surface structures having a height of between at least 5 microns to about 100 microns incorporated therein to increase the contact angle for water at room temperature of the exposed patterned surface portion to over 100 degrees.

11 Claims, 3 Drawing Sheets

(56) References Cited

U.S. PATENT DOCUMENTS

| | | | |
|---|---|---|---|
| 3,354,022 | A | 11/1967 | Dettre |
| 4,168,183 | A | 9/1979 | Greenfield |
| 4,529,668 | A | 7/1985 | Croopnick et al. |
| 5,032,464 | A | 7/1991 | Lichtenberger |
| 5,288,344 | A | 2/1994 | Peker et al. |
| 5,302,414 | A | 4/1994 | Alkhimov et al. |
| 5,352,266 | A | 10/1994 | Erb |
| 5,358,547 | A | 10/1994 | Holko |
| 5,382,505 | A | 1/1995 | Schmidt et al. |
| 5,389,226 | A | 2/1995 | Scruggs et al. |
| 5,433,797 | A | 7/1995 | Erb |
| 5,620,537 | A | 4/1997 | Bampton |
| 5,649,994 | A | 7/1997 | Holko |
| 5,681,575 | A | 10/1997 | Burrel |
| 5,753,251 | A | 5/1998 | Burrel |
| 5,783,371 | A | 7/1998 | Bifano |
| 5,863,410 | A | 1/1999 | Yates |
| 5,872,074 | A | 2/1999 | Schulz |
| 6,036,833 | A | 3/2000 | Tang |
| 6,099,939 | A | 8/2000 | Mittal et al. |
| 6,350,474 | B1 | 2/2002 | Dzneladze et al. |
| 6,406,611 | B1 | 6/2002 | Engelhaupt |
| 6,660,363 | B1 | 12/2003 | Barthlott |
| 6,764,745 | B1 | 7/2004 | Karasawa et al. |
| 6,872,441 | B2 | 3/2005 | Baumann et al. |
| 6,895,795 | B1 | 5/2005 | Chaudhury et al. |
| 7,320,832 | B2 | 1/2008 | Palumbo |
| 7,354,354 | B2 | 4/2008 | Palumbo et al. |
| 7,575,040 | B2 | 8/2009 | Johnson |
| 7,803,072 | B2 | 9/2010 | Palumbo |
| 2003/0187170 | A1 | 10/2003 | Burmeister |
| 2003/0234181 | A1 | 12/2003 | Palumbo et al. |
| 2005/0003146 | A1 | 1/2005 | Spath |
| 2005/0170201 | A1 | 8/2005 | Ware |
| 2005/0205425 | A1 | 9/2005 | Palumbo |
| 2006/0032757 | A1 | 2/2006 | Brevnov et al. |
| 2006/0135281 | A1 | 6/2006 | Palumbo |
| 2007/0031639 | A1 | 2/2007 | Hsu |
| 2007/0084731 | A1 | 4/2007 | Ware |
| 2008/0217180 | A1 | 9/2008 | Doye |
| 2009/0011222 | A1 | 1/2009 | Xiu et al. |
| 2009/0159451 | A1 | 6/2009 | Tomantschger |
| 2009/0246473 | A1 | 10/2009 | Lee |
| 2009/0317590 | A1 | 12/2009 | Hwang |
| 2010/0304172 | A1 | 12/2010 | Facchini et al. |
| 2010/0304179 | A1 | 12/2010 | Facchini et al. |
| 2011/0287203 | A1 | 11/2011 | Victor et al. |
| 2011/0287223 | A1 | 11/2011 | Victor et al. |

FOREIGN PATENT DOCUMENTS

| | | |
|---|---|---|
| CN | 101665968 A | 3/2010 |
| DE | 19730400 | 2/1999 |
| DE | 10108893 A1 | 10/2002 |
| DE | 10228323 A1 | 1/2004 |
| EP | 1 339 270 A2 | 8/2003 |
| EP | 1738812 | 1/2007 |
| EP | 2045368 A1 | 4/2009 |
| KR | 100845744 B | 7/2008 |
| WO | 2006063468 | 6/2006 |
| WO | 2008/100583 A1 | 8/2008 |
| WO | 2010/139053 A1 | 12/2010 |

OTHER PUBLICATIONS

D. Gabe. et. al., "Protective Layered Electrodeposits", Electrochemica Acta, vol. 39, No. 8/9, pp. 1115-1121, 1994.

S.J. Bull et. al., "Multilayer Coatings for Improved Performance", Surface & Coating Technology 78 (1996) 173-184.

D. Facchini, J. L McCrea, F. González, K. Tomantschger, and G. Palumbo, "Small Crystals, Big Benefits: Nanotech cobalt alloy coatings offer hard chrome alternative", Product Finishing, 73, 7, p. 14-18, Apr. 2009.

D. Facchini, J. L McCrea, F. González, G. Palumbo, K. Tomantschger and U. Erb, "Nanostructured Metals and Alloys—Electrodeposited Nanostructured Cobalt Phosphorus Coatings as a Hard Chrome Alternative for Functional Applications," In: Jahrbuch Oberflächentechnik 64 2008: pp. 34-45.

B. Stein, A Practical Guide to Understanding, Measuring and Controlling Stress in Electroformed Metals, AESF Electroforming Symposium, Mar. 27-29, 1996, 1-6, Las Vegas, NV, USA.

Palumbo, G. González, F. Tomantschger, K. Erb, U. Aust, K.T. "Nanotechnology opportunities for electroplating industries" Plating and Surface Finishing, v 90, n 2, p. 36-45, Feb. 2003.

Kim, Simon H.; Erb, U.; Aust, K.T.; Gonzalez, F.; Palumbo, G., "The corrosion behavior of nanocrystalline electrodeposits" Plating and Surface Finishing, v 91, n 5, p. 68-70, May 2004.

Gonzalez, F. McCrea, J. Palumbo, G. Erb, U., "Nanostructured Electrodeposited Cobalt: An Alternative to Hard Chromium", Bulletin- Cercle D Etudes Des Metaux Saint Etienne, 2004, vol. 17; ISSU 9, pp. 27, (May).

Karimpoor, A.A.; Erb, U.; Aust, K.T.; Palumbo, G. "High strength nanocrystalline cobalt with high tensile ductility" Scripta Materialia, v 49, n 7, p. 651-6, Oct. 2003.

Karimpoor, A.A.; Erb, U.; Aust, K.T.; Wang, Z.; Palumbo, G "Tensile properties of bulk nanocrystalline hexagonal cobalt electrodeposits" Materials Science Forum, v 386-388, p. 415-20, 2002.

Kim, S.H.; Aust, K.T.; Erb, U.; Gonzalez, F.; Palumbo, G "A comparison of the corrosion behaviour of polycrystalline and nanocrystalline cobalt" Scripta Materialia, v 48, n 9, p. 1379-84, May 2003.

Hibbard, G.; Aust, K.T.; Palumbo, G.; Erb, U. "Thermal stability of electrodeposited nanocrystalline cobalt" Scripta Materialia, v 44, n 3, p. 513-18, Mar. 16, 2001.

Osmola, D.; Renaud, E.; Erb, U.; Wong, L.; Palumbo, G.; Aust, K.T. "Synthesis of nanocrystalline Co-W alloys" Materials Research Society Symposium Proceedings, v 286, p. 191-196, 1993.

Hibbard, G.D.; Palumbo, G.; Aust, K.T.; Erb, U. "Nanoscale combined reactions: non-equilibrium α-Co formation in nanocrystalline & epsi;-Co by abnormal grain growth" Philosophical Magazine, v 86, n 2, p. 125-39, Jan. 11, 2006.

Szpunar, Barbara; Aus, Martin; Cheung, Cedric; Erb, Uwe; Palumbo, Gino; Szpunar, Jerzy A "Magnetism in nanostructured Ni-P and Co-W alloys" Journal of Magnetism and Magnetic Materials, v 187, n 3, p. 325-336, Sep. 1, 1998.

Hibbard, G.D.; Aust, K.T.; Erb, U. "The effect of starting nanostructure on the thermal stability of electrodeposited nanocrystalline Co" Acta Materialia, v 54, n 9, p. 2501-10, May 2006.

Karimpoor, A.A.; Erb, U. "Mechanical properties of nanocrystalline cobalt" Physica Status Solidi A, v 203, n 6, p. 1265-70, May 2006.

Karimpoor, A.A.; Aust, K.T.; Erb, U. "Charpy impact energy of nanocrystalline and polycrystalline cobalt" Scripta Materialia, v 56, n 3, p. 201-4, Feb. 2007.

Hibbard, G.D.; Aust, K.T.; Erb, U. "Thermal stability of electrodeposited nanocrystalline Ni-Co alloys" Materials Science and Engineering A, v 433, n 1-2, p. 195-202, Oct. 15, 2006.

Mohammadreza Baghbanan, Uwe Erb, Gino Palumbo "Towards the application of nanocrystalline metals in MEMS" Physica Status Solidi (a), 203, 6, p. 1259-1264, 2006.

Eric W. Brooman, "Wear behavior of environmentally acceptable alternatives to chromium coatings: cobalt-based and other coatings" Metal Finishing, vol. 102, Issue 10, Oct. 2004, pp. 42-54.

M.A. Sheikholeslam, M.H. Enayati and K. Raeissi, "Characterization of nanocrystalline and amorphous cobalt—phosphorous electrodeposits" Materials Letters, vol. 62, Issues 21-22, Aug. 15, 2008, pp. 3629-3631.

Ms. Diana Facchini, Dr. Jonathan McCrea, Mr. Iain Brooks, Dr. Francisco Gonzalez, Dr. Gino Palumbo. "Electrodeposited Nanocrystalline Metals and Alloys as Environmentally Compliant Alternative Coatings to Functional Hexavalent Chromium and Cadmium" Aeromat 2009, Dayton OH, Jun. 9, 2009.

D. Facchini, N. Mahalanobis, F. Gonzalez, R. A. Prado, J. Benfer, K. Legg "Nanocrystalline Cobalt-Alloy Coatings for Chrome Replacement Applications" SERDP/ESTCP Partners in Environmental Technology Symposium, Washington DC, Dec. 1-3, 2009.

D. Facchini, Dr. Jon McCrea, Dr. Francisco Gonzalez, Dr. Gino Palumbo Ruben Prado, Dr. Keith Legg "Nanocrystalline Cobalt-Alloy Coatings for Chrome Replacement Applications" SERDP/ESTCP Partners in Environmental Technology Symposium, Washington DC, Dec. 2-4, 2008.

D. Facchini, J.L. McCrea, F. Gonzalez, R. Prado, K. Legg and G. Palumbo "Nanocrystalline Cobalt-Alloy Coatings for Non-Line-of-Sight Chrome Replacement Applications" SERDP/ESTCP Partners in Environmental Technology Sumposium, Washington DC, Dec. 4-6, 2007.

Diana Facchini, Ruben Prado "Electrodeposition of Nanocrystalline Co-P Coatings as a Hard Chrome Alternative", ASETS Defense Meeting, Denver, Colorado, Sep. 2, 2009.

Diana Facchini, Ruben Prado, Keith Legg "Electrodeposited Nano Co-P: Coating Development and Technology Insertion at NADEP-JAX" Surface Finishing and Repair Issues for Sustaining New Military Aircraft, Phoenix, Arizona, Feb. 27, 2008.

Paco Gonzalez, "Dem-Val of Electrodeposited Nano Co-P Alloys for NLOS Coating Applications at NADEP Jacksoville" HCAT Meeting, San Diego, California, Jan. 25, 2006.

Paco Gonzalez, "Nanocrystalline CoP for Cr-Replacement", HCAT Meeting, Greensboro, North Carolina, Mar. 15-17, 2005.

Paco Gonzalez, "Nanocrystalline CoP for Cr-Replacement", HCAT Meeting, Park City, Utah, Jul. 20-21, 2004.

Jonathan L. McCrea, Paco Gonzalez, Doug Lee and Uwe Erb "Electroformed Nanocrystalline Coatings An Advanced Alternative to Hard-Chrome Electroplating PP-1152" HCAT Meeting, Cape Canaveral, Florida, Nov. 18-19, 2003.

Douglas E. Lee, Dr. Jonathan L. McCrea, Dr. Uwe Erb, "Electroformed Nanocrystalline Coatings An Advanced Alternative to Hard-Chrome Electroplating PP-1152" HCAT Meeting, San Diego, California, Apr. 2, 2003.

Dr. Maureen J. Psaila-Dombrowski, Douglas E. Lee, Dr. Jonathan L. McCrea, Dr. Uwe Erb, "Electroformed Nanocrystalline Coatings An Advanced Alternative to Hard-Chrome Electroplating PP-1152" Toronto, Ontario, Sep. 26, 2002.

Dr. Maureen J. Psaila-Dombrowski, Douglas E. Lee, Dr. Jonathan L. McCrea, Dr. Uwe Erb, "Electroformed Nanocrystalline Coatings An Advanced Alternative to Hard-Chrome Electroplating PP-1152" HCAT Meeting, Toronto, Ontario, Aug. 30, 2001.

Nihad Ben Salah,S. Beskri and J. Sapieha, "Development of nano-Co-P plating as a replacement for hard chrome for engine components", SERDP/ESTCP Workshop—Surface finishing and repair issues, Tempe, Az, Feb. 26-28, 2008.

Dr. E.W. Brooman, Mr. T.A. Naguy, Dr. M.L. Klingenberg, "Evaluation of Alternatives to Hard Chromium Coatings for Air Force Repair and Overhaul Applications", SUR/FIN 2007, Cleveland, OH, Aug. 13-16, 2007.

McCrea, J.L., Facchini, D., Gonzalez, F. and Palumbo, G., "Nanocrystalline Cobalt-Alloy Coatings for Non-Line-of-Sight Chrome Replacement Applications," in Proceedings of SUR/FIN 2007, Cleveland, (2007).

Nascimento et al., Effects of Surface Treatments on the Fatigue Strength of AISI 4340 Aeronautical Steel, International Journal of Fatigue, 23 (2001) 607-618.

Srirarnan, Influence of Crystallite Size on the Hardness and Fatigue Life of Steel Samples Coated with Electrodeposited Nanocrystaline Ni-W Alloys, Materials Letters, 61 (2007) pp. 715-715.

U.S. Appl. No. 12/785,650, filed May 24, 2010, Victor et al.

U.S. Appl. No. 12/785,662, filed May 25, 2010, Victor et al.

J. Pacifico, et.al,;"Superhydrophobic Effects of Self-Assembled Monolayers on Micropatterned Surfaces: 3-D Arrays Mimicking the Lotus Leaf"; Langmuir, (Nov. 8, 2006) 22, 11072-11076.

M. Shafiei, et.al; "Nanocrystalline Ni films with lotus leaf texture for superhydrophobic and low friction surfaces"; Applied Surface Science 256 (Aug. 19, 2009) 710-719.

Y. Zhou, et.al; "Superhydrophobic surfaces created by the silver mirror reaction and its drag-reduction effect on water" Journal of Material Chemistry (Mar. 30, 2009), 19, 3301-3306.

Y. Lee, et.al; "Fabrication of Hierarchical Structures on a Polymer Surface to mimic Natural Superhydrophobic Surfaces"; Adv. Mater. (2007), 19, 2330-2335.

A. Khan, et.al; "Nanocrystalline aluminum and iron: Mechanical behavior at quasi-static and high strain rates, and constitutive modeling"; International Journal of Plasticity 22 (2006) 195-209.

Alumatter; http://aluminium.matter.org.uk/, (accessed on Jun. 13, 2012).

L Feng, et.al; "Super-Hydrophobic Surfaces: From natural to Artificial"; Advanced Materials 2002, 14, No. 24, (Dec. 17, 2002).

Jack Champaigne Electronics Inc.; "Shot Peening Overview", (Jan. 18, 2001).

Extended European Search Report EP Serial No. 10782857.6 dated Oct. 17, 2012.

Extended European Search Report EP Serial No. 12180056.9 dated Oct. 17, 2012.

Liu, et al., A Replication Strategy for Complex Micro/Nanostructures with Superhydrophobicity and Superoleophobicity and High Contrast Adhesion, Jun. 29, 2009, Soft Matter, vol. 5, pp. 3097-3105, 9 pages.

U.S. Office Action, U.S. Appl. No. 12/785,662, dated Nov. 21, 2012, 18 pages.

| Coating | Porosity [%] | Photograph | ImageJ Photograph |
|---|---|---|---|
| Cr | 1.6 | | |
| n-Co-2P | 0.1 | | |

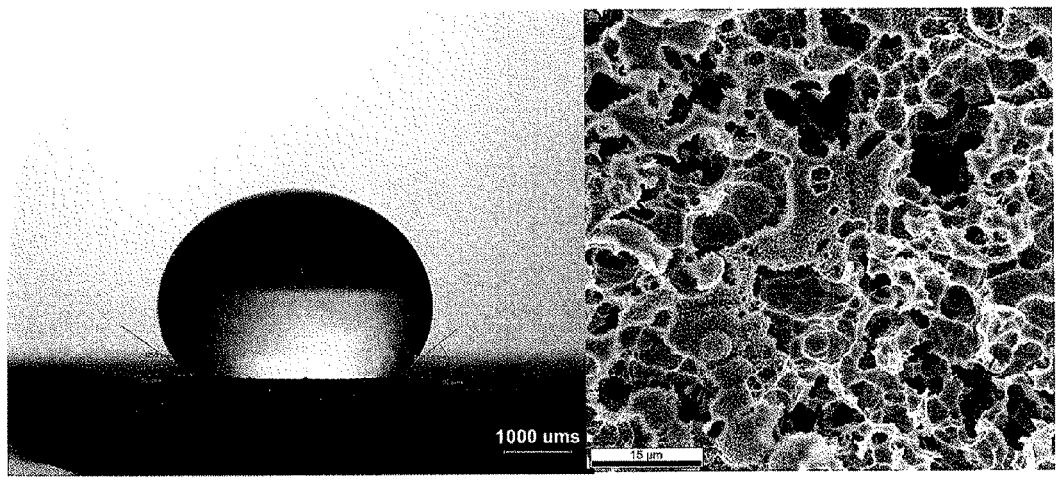
FIGURE 5a　　　　　　　FIGURE 5b
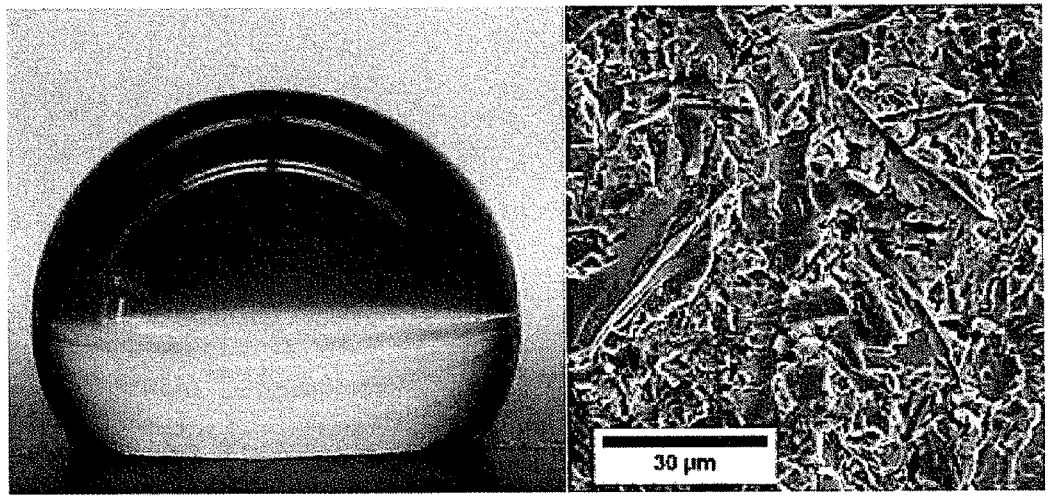
FIGURE 6a　　　　　　　FIGURE 6b

ELECTRODEPOSITED METALLIC MATERIALS COMPRISING COBALT

CROSS REFERENCE TO RELATED APPLICATION

This application is a continuation in part of application Ser. No. 12/548,750, filed Aug. 27, 2009 which is a continuation in part of application Ser. No. 12/476,424, filed on Jun. 2, 2009.

FIELD OF THE INVENTION

This invention relates to the electrodeposition of coatings or free-standing components comprised of cobalt bearing metallic materials that possess a fine-grained and/or amorphous microstructure. The proper selection of the electrodeposition processing parameters enables the efficient production of fully-dense, hard, wear resistant metallic materials comprising Co that also exhibit enhanced anti-microbial, antibacterial, anti-fungal and/or anti-viral and hydrophobic behavior. This invention also relates to applying the fine-grained and/or amorphous metallic coatings comprising Co to metallic substrates by electrodeposition without compromising the fatigue performance. The invention is particularly well suited for the fabrication of articles containing outer surfaces that require enhanced biocidal performance, wear performance and fluid-repellency and are subject to load during use, e.g., outer surfaces on health care, household, industrial and consumer goods.

BACKGROUND OF THE INVENTION

Coatings deposited on metallic substrates are extensively used in consumer and industrial applications. The most commonly used industrial coating is Cr (Cr) which is electrodeposited from its hexavalent state from aqueous electrolytes. Cr coatings (0.00025" to 0.010" thick) are used extensively for imparting wear and erosion resistance to components in industrial, aerospace and military applications because of their intrinsic high hardness (600-1,000 VHN) and their low coefficient of friction (<0.2). Hard Cr electrodeposition from hexavalent Cr baths is used to apply hard Cr coatings to a variety of aircraft components in manufacturing and repair and overhaul operations, most notably landing gear, hydraulic actuators, gas turbine engines, helicopter dynamic components and propeller hubs. Process and performance drawbacks of Cr coatings include the low current efficiency of the hexavalent Cr plating processes, low deposition (or build) rates compared to the plating of other metals and alloys (e.g., 12.5 µm to 25 µm per hour for Cr versus over 200 µm per hour for Ni). The intrinsic stress and brittleness of Cr deposits (i.e., <0.1% tensile elongation) invariably leads to micro- or macro-cracked deposits. Although these 'cracks' do not compromise wear and erosion resistance, cracked or porous coatings are unacceptable for applications requiring corrosion and/or fatigue resistance. Voids, macro and micro cracks in coatings allow for moisture ingress severely limiting the corrosion resistance of e.g., Cr plated steel parts. Further, these defects act as stress concentrators and invariably become crack initiation sites under low stress (i.e., <yield stress) cyclic loading, thereby reducing the fatigue life of the component (i.e., imparting a fatigue debit). In corrosion protection applications, an electrodeposited under layer of more ductile and corrosion resistant material (usually Ni) must be applied, or the substrate must be shot-peened to impart a residual compressive stress to improve the fatigue resistance.

The most common health effect from exposure to Cr metal is contact dermatitis, a skin inflammation or rash. A fraction of the population, between 5 and 10 percent, has an allergic skin reaction to Cr which, much like other allergies, is genetically based. Avoiding skin contact with Cr—in jewelry for example—is not a problem for most of the general population but it is for those whose occupations involve daily exposure to Cr compounds, such as, e.g., cement workers and electroplaters, which may develop chronic allergic reactions.

As a result of the toxicity of Cr compounds, maximum exposure levels of chromate ions are regulated. The US Department of Labor's Occupational Safety and Health Administration (OSHA) recently reduced the permissible exposure limit (PEL) for hexavalent Cr and all hexavalent Cr compounds from 52 µg/m$^3$ to 5 µg/m$^3$ as an 8-hour time weighted average. In addition to tighter limits on air pollution the EPA has also set new limits for Cr in the water recognizing that the electrodeposition of Cr is a hazardous process. Due to the expected increase in operational costs associated with compliance to the proposed rule, environmentally benign alternatives to hard Cr plating are being sought. As well the EPA has listed Ni as a pollutant which is to be phased out.

It is well documented that applying electroplated coatings including Ni and Cr to steel reduces the fatigue performance of the plated part.

From the aforementioned, it is apparent that there is great need to replace electroplated Cr coatings with Cr- and Ni-free wear resistant coatings which meet or exceed the physical properties of Cr coatings with alternative coatings which are biocompatible, safe, are not limited to line-of sight applications and introduce properties not inherent to Cr based coatings, including, but not limited to, low porosity, enhanced fatigue resistance, non-wetting and anti-microbial properties.

Coating technologies considered as suitable Cr alternatives include other suitable Cr-free coatings applied by electrolytic or electroless plating techniques as well as thermal spray processes including high velocity oxygen fuel (HVOF) thermal spray and plasma vapor deposition. Although HVOF thermal spray coatings generally meet the properties of electrodeposited Cr, their application is limited to line-of-sight applications, i.e., the inside diameter of tubular structures less than 40 cm in diameter and 1:1 width-to-depth aspect ratios and blind holes cannot be coated using this technology.

For coating applications requiring non-line-of-sight deposition and/or high-volume, low-added-value production, it is generally accepted that only electroplating technologies will be suitable and/or cost effective. Traditionally, most of the electroplated coating alternatives have been based on Ni alloys, including both electroless (Ni—P and Ni—B) and electrolytic (Ni—W, Ni—Co, Ni—Mo, etc.) coatings. As Ni is listed by the Environmental Protection Agency (EPA) as a priority pollutant and is considered to be one of the 14 most toxic heavy metals, coatings containing Ni, at best, are considered to represent a short-term solution. Bath stability issues and adhesion failures limit the use of electroless coatings particularly in aerospace applications.

It is therefore evident that a Ni-free electroplating technology would be ideal to provide an environmentally acceptable alternative for non-line-of-sight applications currently addressed with Cr.

The prior art has disclosed the use of cobalt (Co) bearing electrodeposited coatings:

Brenner in U.S. Pat. No. 2,643,221 (1950) discloses the electrodeposition of Ni—P and Co—P alloy coatings from solutions containing the metal ions and phosphates and considered them suitable for use as alternatives to Cr electrodeposits. Specifically to Co-bearing coatings, Brenner noted that they were dull at lower than 9% phosphorus (P), they turned black when exposed to oxidizing conditions and overall Brenner prefers Ni—P for protective and decorative applications. Brenner is silent on the microstructure, the coating stress, the fatigue performance, the wetting behavior and the antibacterial properties of all coatings.

Holko in U.S. Pat. No. 5,358,547 (1994) and U.S. Pat. No. 5,649,994 (1997) describes wear resistant coatings of cobalt and phosphorus for metallic surfaces. The preferred composition consists of Co-11P, i.e., 11% per weight of P, which represents approximately the "eutectic" composition. Preferred applications include surgical blades, files and burrs, guide slots, drills and drill guides, surgical instruments and medical prostheses. While Holko's preferred method of application is the use of metal powders and binders followed by heat-treatment, i.e., powder metallurgy, as illustrated in all examples, Holko does extend his application methods to include other synthesis processes such as electroless and electrodeposition. Holko is silent on the microstructure, the coating stress, the fatigue performance, the wetting behavior and the antibacterial properties of the coatings.

Tang in U.S. Pat. No. 6,036,833 (2000) discloses electroplated nickel, cobalt, nickel alloys or cobalt alloys without any internal stress deposited from a Watts bath, a chloride bath or a combination thereof, by employing pulse plating with periodic reverse pulses and sulfonated naphthalene additives.

Engelhaupt in U.S. Pat. No. 6,406,611 (2002) describes amorphous electrodeposited Ni—P or Ni—Co—P alloys which are essentially free of stress.

Ware in US 2005/0170201 and US 2007/0084731 describes coarse-grained Co—P—B coatings of low compressive residual stress and improved fatigue resistance. Ware discusses the "nanophase Co alloy coating" developed by Integran Technologies Inc. of Toronto, Canada, the applicant of this case. According to Ware this technology requires plating equipment that is different from the existing Cr plating equipment and, therefore, requires costly modifications of existing facilities. Ware states that high residual stress of Co alloy coatings results in an unacceptable decrease in fatigue resistance.

As highlighted by Ware, electrodeposited nanocrystalline Co based electrodeposited coatings have been proposed by Integran Technologies Inc. of Toronto, Canada, the applicant of this invention, as an alternative to electrodeposited Cr coatings.

Erb in U.S. Pat. No. 5,352,266 (1994), and U.S. Pat. No. 5,433,797 (1995), assigned to the applicant, describe a process for producing nanocrystalline materials, particularly nanocrystalline nickel. The nanocrystalline material is electrodeposited onto the cathode in an aqueous acidic electrolytic cell by application of a pulsed current.

Palumbo in US 2005/0205425 and DE 10,228,323 (2005), assigned to the same applicant, discloses a process for forming coatings or freestanding deposits of nanocrystalline metals, metal alloys or metal matrix composites. The process employs tank, drum plating or selective plating processes using aqueous electrolytes and optionally a non-stationary anode or cathode. Nanocrystalline metal matrix composites are disclosed as well.

Tomantschger in US 2009/0159451, assigned to the same applicant, discloses variable property deposits of fine-grained and amorphous metallic materials, optionally containing solid particulates.

Palumbo in U.S. Pat. No. 7,320,832 (2008), assigned to the same applicant, discloses means for matching the coefficient of thermal expansion of a fine-grained metallic coating to the one of the substrate by adjusting the composition of the alloy and/or by varying the chemistry and volume fraction of particulates embedded in the coating. The fine-grained metallic coatings are particularly suited for strong and lightweight articles, precision molds, sporting goods, automotive parts and components exposed to thermal cycling. Maintaining low coefficients of thermal expansion and matching the coefficient of thermal expansion of the fine-grained metallic coating with the one of the substrate minimizes dimensional changes during thermal cycling and prevents delamination.

The prior art describes numerous processes for affecting fatigue performance and to deal with the loss of fatigue resistance (fatigue debit) imparted by electrodeposited coatings.

Nascimento et. al. in the International Journal of Fatigue 23 (2001), 607-618, reports various fatigue data for surface treated and untreated 4340 aeronautical steel for electroplated Cr and electroless Ni coatings. In all instances, the addition of a coating layer showed a decrease in fatigue strength. All Cr-containing coatings resulted in poorer fatigue performance than the uncoated material as evident in FIGS. 2, 6, 9, 11 and 14.

Sriraman et. al. in Materials Letters 61 (2007) 715-718 reports on the fatigue resistance of steel coated with nanocrystalline Ni—W alloys by electrodeposition and reports inferior fatigue lives for all coated samples. Greenfield in U.S. Pat. No. 4,168,183 (1979) describes a process for improving the fatigue properties by coating the substrate with materials that contain a solute, prestraining the part to create dislocations in the surface layer, and annealing to diffuse the solute into the deformed surface layer.

The prior art has also disclosed the use of metals for use in anti-microbial and anti-bacterial applications:

Burrell in U.S. Pat. No. 5,681,575 (1997) and U.S. Pat. No. 5,753,251 (1998) teaches the synthesis of antimicrobial metals, specifically Ag, Cu, Sn, Zn and noble metals, which release ions exhibiting enhanced antimicrobial activity that is intrinsic to the bulk metal by virtue of its high stored internal energy. Note that Burrell's definition of "metals" is not limited to what is generally accepted to represent "metallic materials", i.e., metals and alloys, but is significantly expanded to also include electrically non-conductive metal compounds such as oxides, nitrides, borides, sulfides, halides and hydrides. The optimized, sustained ionic dissolution rate is due to the ultrafine-grained microstructure of the "metallic films". While it is demonstrated that a distinctly enhanced, sustained anti-microbial effect is associated with the processing of "metals" in fine-grained form, the material processing technique of Burrell et al, is based upon vapor deposition methods such as physical vapor deposition (PVD) and chemical vapor deposition (CVD). While such techniques are suitable for the synthesis of fine-grained anti-microbial materials, unfortunately they are not suited for the production of highly abrasive, wear-resistant, scratch-resistant and scuff-resistant surfaces as the vapor deposited coatings are generally thin (typically <<10 μm thickness), porous (<<98% theoretical density) and soft (<200 VHN).

In order to satisfy the basic durability requirements of hospital, household, and consumer goods touch-surfaces, especially in high traffic areas, the inherent mechanical limitations of thin and porous sputtered antimicrobial films as disclosed in the Burrel patents must be overcome. This necessitates the use of a processing technique capable of producing fine-grained metallic materials that exhibit the desired unassisted sustained release of metal ions inherent to fine-grained microstructures while simultaneously exhibiting good hardness, strength, toughness, scratch resistance, abrasive/sliding wear, and scuff resistance properties.

The prior art also describes various means of increasing the water repellent properties of hydrophobic, predominantly polymeric surfaces by surface roughening.

Dettre in U.S. Pat. No. 3,354,022 (1967) describes water repellent surfaces, having an intrinsic advancing water contact angle of more than 90° and an intrinsic receding water contact angle of at least 75°, by creating a micro rough structure with elevations and depressions in a hydrophobic material. The high and low portions have an average distance of not more than 1,000 microns. The average height of high portions is at least 0.5 times the average distance between them. The air content is at least 60% and, in particular, fluorine containing polymers are disclosed as the hydrophobic material of choice.

SUMMARY OF THE INVENTION

The invention relates to electroplating, conforming fine-grained and/or amorphous metallic layers, coatings or patches comprising Co onto suitable substrates or to electroforming free-standing, fine-grained and/or amorphous metallic materials comprising Co.

The invention also relates to a method of suitably texturing/roughening at least part of the exposed surface(s) of articles comprising amorphous and/or fine-grained Co-based materials to render their surface fluid-repellant, particularly water-repellant, e.g., by introducing a dual surface structure.

It is an objective of the invention to produce fine-grained and/or amorphous Co-comprising metallic materials by electrodeposition including both direct current (DC) and pulsed electrolytic deposition as the plating conditions can be adjusted to conveniently achieve the desired properties. Suitable methods of electroplating include tank, barrel and brush plating. Metal matrix composites (MMCs) can be produced by electrodeposition by suitably suspending particles in the plating bath resulting in the incorporation of the particulate matter in the electrodeposit by inclusion. Alternatively, MMCs can be formed by electroplating porous structures including foams, felts, clothes, perforated plates and the like.

The invention relates to applying hard, substantially porosity and crack-free, bright, ductile, metallic materials comprising Co with significant internal stress by electrodeposition to at least part of the surface of permanent (electroplating) or temporary (electroforming) substrates.

It is an objective of the present invention to provide Co-bearing coatings as replacements for Cr coatings which are currently commonly used as wear-resistant coatings, e.g., in aerospace, automotive, medical, industrial and consumer applications.

It is an objective of the present invention to provide Co based alloys and metal matrix composite coatings which have the potential to eliminate environmental and worker safety issues inherent to Cr electroplating while significantly improving the performance for a variety of applications and result in coated articles without the introduction of a decrease in fatigue resistance, as is common to electrodeposited coatings.

It is another objective of the invention to suitably pretreat the surface of substrate materials and/or post treat the coated article to enhance the fatigue performance by heat-treating and/or cold working such as peening including shot, hammer and laser peening, and/or polishing and/or superfinishing.

It is another objective of the invention to achieve a bond strength between the Co-bearing layer and the permanent substrate which shows no signs of peeling or delamination between the Co-comprising coating and the substrate at low (10×) magnification when tested in accordance with the bend test described in ASTM B571.

It is an objective of the invention to improve the hardness of the Co bearing coatings by a suitable heat-treatment of between 5 minutes and 50 hours at between 50 and 500° C.

It is an objective of the present invention to provide Co-bearing coatings for parts that are severely loaded during use such as sliding surfaces and surfaces experiencing impact during service, including, but not limited to hydraulic bars and tubes, as well as aerospace parts such as landing gear parts, pistons, shafts, pins, flap track carriage spindles and hooks.

It is an objective of this invention to at least partially coat the inner or outer surface of parts including complex shapes with fine-grained and/or amorphous metallic Co-bearing materials, using electrodeposition, that are strong, lightweight, have high toughness and stiffness (e.g., resistance to deflection and higher natural frequencies of vibration), are able to withstand thermal cycling without degradation and without reducing the fatigue performance.

It is an objective of the invention to provide metallic coatings, layers and/or patches selected from the group of amorphous and/or fine-grained metals, metal alloys or metal matrix composites comprising Co. The metallic coating/layer is applied to at least part of the surface of the substrate by electrodeposition. The coating process can be applied to new parts and/or can be employed as a repair/refurbishment technique.

It is an objective of the invention to provide metallic coatings, layers and/or patches selected from the group of amorphous and/or fine-grained metals, metal alloys or metal matrix composites comprising Co wherein the electrodeposited metallic layer and/or patch comprising Co represents up to 100%, e.g., between 1 and 99% of the total weight of the article.

It is an objective of the invention to provide enhanced mechanical strength, erosion and wear properties, improved lubricity, and preferably anti-microbial properties by applying fine-grained metallic coatings/layers comprising Co with an average grain size between 2 and 5,000 nm and/or amorphous coatings/layers and/or metal matrix composite coatings comprising Co. Graded and/or layered structures comprising Co can be employed as well.

It is an objective of the present invention to provide durable, scratch and abrasion resistant, strong, lightweight articles that are fluid repellant comprising fine-grained and/or amorphous Co-bearing metallic materials for use in a large variety of applications, e.g., in parts for use in transportation applications (including automotive, aerospace, ships and other vessels navigating in and on water, and their components), defense applications, industrial components, electronic equipment or appliances and their components, sporting goods, molding applications, building materials and medical applications.

It is an objective of the invention to provide biocompatible Co-metals, Co-alloys and Co-metal matrix composites that exhibit a highly desirable combination of anti-microbial, anti-bacterial, anti-inflammatory, anti-fungal and anti-viral efficacy and enhanced mechanical durability. The inventive process renders the materials functionally biocidal yet highly resistant to abrasive and/or sliding wear, scuffing and scratching.

It is the objective of the invention to provide preferred embodiments of articles comprising Co which are biocidal which, apart from unavoidable impurities, are substantially free of Ni, Cr, Pb, Sb, As and other toxic elements and/or which, apart from unavoidable impurities, are free of Ag, Cu, Sn, Zn and noble metals.

It is the objective of the invention to provide articles or coatings comprising Co which after 24 hrs at 37° C. displays a "radius of no growth" on the zone inhibition test for *salmonella* or *listeria* ranging from range of 0.5 mm to 50 mm.

It is a further objective of the present invention to render the external surfaces comprising strong and hard amorphous and/or fine-grained Co-bearing metallic material, having an inherent contact angle for water on a flat and smooth surface of <90°, water repellant by modifying the outer surface and suitably forming dual surface structures without the addition of inherently hydrophobic materials or coatings.

It is an objective of the present invention to create or render amorphous and/or fine-grained Co-bearing metallic material surfaces, having an intrinsic contact angle for water of <90°, when measured on its smooth surface, water repellant by forming various recesses and depressions which extend inwardly from the original surface of the metallic material and/or by forming various elevations which protrude from the original surface of the metallic material.

It is an objective of the invention to suitably create numerous pits and crevices or protrusions in at least portions of the outer surface of the Co-bearing metallic material that are randomly and/or evenly distributed which result in an increase in the contact angle. The shape, size and population of sites such as recesses, pits, crevices, depressions and the like is believed to enable the entrapment of air thus providing for the "lotus" or "petal" effect. It is an objective to create micron-sized recessed-structures exceeding a density of between 25 and 10,000, preferably between 100 and 5,000 sites per $mm^2$ area or a range of between 5 and 1,000 sites per mm. "Micron-sized" surface structure dimensions range from 1-1,000 µm; specifically preferably from 5-100 µm in depth/height, preferably from 10-50 µm in diameter, preferably spaced between 5-100 µm apart, and more preferably between 10 and 50 µm apart.

It is an objective of the invention to render smooth, inherently hydrophilic, Co-bearing metallic material surfaces hydrophobic by introducing surface structures therein containing a plurality of micron-sized features, wherein the plurality of micron-sized features furthermore preferably has a substructure comprising of a plurality of nanoscale features, i.e., the surface sites contain both micro and nanoscale structures.

It is an objective of the invention to suitably create a self-cleaning Co-bearing metallic surface preferably having a low roll off angle and/or high contact angle for water by an economic, convenient and reproducible process.

It is an objective of the invention to suitably overlay primary surface structures/features with an ultra-fine pattern/roughness of secondary surface features to conveniently create Co-bearing metallic materials having a fine-grained and/or amorphous microstructure for use as embossing or forming dies.

It is another objective of the invention to apply a metallic Co-bearing material directly onto a substrate. Alternatively, one or more intermediate structures selected from the group of metallic layers, metal alloy layers and metal matrix composite layers can be employed. Metallic intermediate structures can be deposited by a process selected from electroless deposition, electrodeposition, physical vapor deposition (PVD), chemical vapor deposition (CVD), powder spraying and gas condensation. Intermediate structures are always used when a substrate to be coated is poorly conductive or non conductive, e.g., in the case of polymers or ceramics.

It is an objective of the invention to apply a fine-grained and/or amorphous metallic Co-bearing coating to at least a portion of a surface of a part, optionally after metalizing the surface (metalizing layer thickness <5 µm, preferably <1 µm) with a thin layer of Co, Ni, Cu, Ag, Zn or the like prior to applying a porosity-free, conforming Co-bearing metal layer by electrodeposition. The fine-grained and/or amorphous Co-bearing coating is usually substantially thicker (>>5 µm) than the metalizing layer.

It is an objective of this invention to provide a fine-grained and/or amorphous metallic layer or coating comprising Co by electrodeposition by providing an electroplating bath which includes an electroplating solution containing Co metal ions, e.g., by dissolving suitable Co salts such as chlorides, sulfates and/or carbonates, and optionally one or more components selected from the group consisting of other non-toxic metal ions (e.g., Fe, Mo, W and Zn), phosphorus (P) containing compounds including, but not limited to, phosphorous ions ($PO_3'''$), phosphoric ions ($PO_4'''$); boron (B) containing compounds including, but not limited to, borate ions ($BO_3'''$); non-toxic particulates (carbon, graphite, diamond, BN, $B_4C$); brighteners, grain-refiners, surfactants and stress relievers.

It is an objective of this invention to provide a fine-grained and/or amorphous metallic layer or coating comprising Co optionally containing solid particulates dispersed therein. The fine-grained and/or amorphous metallic layers or coatings comprising Co are particularly suited for strong and lightweight articles exposed to loads and/or thermal cycling. Examples include Co, Co—W, Co—P and Co—W—P with 2.5-50% per volume of one or more particulates selected from the group consisting of diamond; graphite; BN or other nitrides; $B_4C$, WC or other carbides; and PTFE.

It is an objective of the invention to provide fine-grained and/or amorphous coatings comprising Co which exhibit an internal stress (tensile or compressive) ranging from 2.5 to 30 ksi (17.3 to 207 MPa).

It is an objective of this invention to provide articles containing fine-grained and/or amorphous metallic coatings comprising Co, optionally graded or layered, on suitable substrates which do not provide a fatigue debit over either the uncoated substrate or the Cr coated substrate of equivalent thickness when tested for fatigue performance in accordance with at least one suitable fatigue test, e.g., axial fatigue, bending fatigue, beam fatigue, torsional fatigue, rotating beam fatigue and rotating bending fatigue. Suitable fatigue tests include, but are not limited to, ASTM E466: *Standard Practice for Conducting Force Controlled Constant Amplitude Axial Fatigue Tests of Metallic Materials*; E606: *Standard Practice for Strain-Controlled Fatigue Testing*; ISO 1099: *Metallic Materials—Fatigue Testing—Axial Force-Controlled Method*; ISO 12106: *Metallic Materials—Fatigue Testing—Axial-Strain-Controlled Method*; and ISO 1143: *Metals—Rotating Bar Bending Fatigue Testing*.

It is an objective of this invention to provide articles comprising fine-grained and/or amorphous metallic coatings comprising Co which are, at least in part, graded and/or layered, selected from the group consisting of a freestanding variable property Co-bearing metallic deposit, freestanding variable property Co-bearing layered structure, a variable deposit Co-bearing metallic coating and a variable deposit Co-bearing layered coating. "Variable property" is defined as a deposit property including, but not limited to, chemical composition, grain size, hardness, yield strength, Young's modulus, resilience, elastic limit, ductility, internal stress, residual stress, stiffness, coefficient of thermal expansion, coefficient of friction, electrical conductivity, magnetic coercive force, and thickness, being varied by more than 10% in the deposition direction, i.e., layer height direction, and/or at least in one of the length or width directions. "Layered structures" have said deposit property varied by more than 10% between sublayers and the sublayer thickness ranges from 1.5 nm to 1,000 microns.

It is an objective of this invention to provide articles containing fine-grained and/or amorphous metallic coatings comprising Co on substrates capable of withstanding 1, preferably 5, more preferably 10, more preferably 20 and even more preferably 30 temperature cycles without failure according to ANSI/ASTM specification B604-75 section 5.4 (*Standard Recommended Practice for Thermal Cycling Test for Evaluation of Electroplated Plastics* ASTM B553-71) for service condition 1, preferably service condition 2, preferably service condition 3 and even more preferably for service condition 4.

It is an objective to apply stiff, rigid and tough metallic coatings and/or metallic patches comprising Co to complex part geometries by a process enabling net-shape-forming of conforming shapes on parts of complex geometries.

It is an objective to provide conforming, substantially porosity-free metallic coatings comprising Co and/or metallic patches comprising Co to parts as a structural repair or refurbishment technique.

It is an objective of the present invention to provide strong, lightweight fully-dense, ductile, conforming metallic barrier layers and/or patches comprising Co to substrates/articles for use in a number of applications including, but not limited to, automotive, marine, aerospace and defense applications; industrial components; electronic equipment or appliances; sporting goods; household goods; molding applications and medical applications.

It is an objective of this invention to provide articles, coated with fine-grained and/or amorphous metallic layers comprising Co that are stiff, lightweight, have anti-bacterial properties, are resistant to abrasion and resistant to permanent deformation, do not splinter when cracked or broken and are able to withstand thermal cycling without degradation, for a variety of applications including, but not limited to: (i) applications requiring cylindrical objects including gun barrels; shafts, tubes, pipes and rods; golf and arrow shafts; skiing and hiking poles; various drive shafts; fishing poles; baseball bats, bicycle frames, ammunition casings, wires and cables and other cylindrical or tubular structures for use in commercial goods; (ii) medical equipment including orthopedic prosthesis and surgical tools, crutches, wheel chairs, implants including stents and fracture fixation devices; (iii) sporting goods including golf shafts, heads and faceplates; lacrosse sticks; hockey sticks; skis and snowboards as well as their components including bindings; racquets for tennis, squash, badminton; bicycle parts; (iv) components and housings for electronic equipment including laptops; televisions and handheld devices including cell phones; personal digital assistants (PDAs) devices; walkmen; discmen; digital audio players, e.g., MP3 players and e-mail functional telephones, e.g., a BlackBerry®-type device; cameras and other image recording devices; (v) automotive components including heat shields; cabin components including seat parts, steering wheel and armature parts; fluid conduits including air ducts, fuel rails, turbocharger components, oil, transmission and brake parts, fluid tanks and housings including oil and transmission pans; cylinder head covers; spoilers; grill-guards and running boards; brake, transmission, clutch, steering and suspension parts; brackets and pedals; muffler components; wheels; brackets; vehicle frames; spoilers; fluid pumps such as fuel, coolant, oil and transmission pumps and their components; housing and tank components such as oil, transmission or other fluid pans including gas tanks; electrical and engine covers; (vi) industrial/consumer products and parts including linings on hydraulic actuator, cylinders and the like; drills; files; saws; blades for knives, turbines and windmills; sharpening devices and other cutting, polishing and grinding tools; housings; frames; hinges; sputtering targets; antennas as well as electromagnetic interference (EMI) shields; (vii) molds and molding tools and equipment; (viii) aerospace parts and components including wings; wing parts including flaps and access covers; structural spars and ribs; jet engine parts, propellers; rotors; rotor blades; stators; rudders; covers; housings; fuselage parts; nose cones; landing gear; actuators; lightweight cabin parts; cryogenic storage tanks; ducts and interior panels; and (ix) military products including ammunition, armor as well as firearm components, and the like; that are coated with fine-grained and/or amorphous metallic layers that are stiff, lightweight, resistant to abrasion, resistant to permanent deformation, do not splinter when cracked or broken and are able to withstand thermal cycling without degradation.

Accordingly, the invention is directed to a metal-coated article comprising:
 (i) a substrate material, e.g., of metallic or polymeric material;
 (ii) an electrodeposited substance forming a metallic layer and/or patch on said substrate material or on structure thereon, said metallic layer or patch comprising Co having a microstructure which is fine-grained with an average grain size between 2 and 5,000 nm and/or amorphous, said metallic layer or patch exhibiting a tensile or compressive internal stress in the range of between 2.5 and 30 ksi, and having a thickness between 5 μm and 2.5 mm and a porosity in the range from 0 to 1.5%;
 (iii) with or without at least one intermediate structure between said substrate material and the electrodeposited layer and/or patch comprising Co; and
 (iv) said article exhibiting a fatigue life cycle number equivalent to or exceeding the one of either the uncoated substrate material or equivalent thickness Cr coated substrate material when tested at an applied stress of between ⅓ and ⅔ of the yield strength of said uncoated substrate material.

Accordingly, the invention in another embodiment is directed to an electrodeposited coating or a free-standing layer comprising Co having a microstructure which is fine-grained with an average grain size between 2 and 5,000 nm and/or is amorphous, the Co-comprising layer or coating, having a thickness between 5 μm and 2.5 mm, a porosity between 0 and 1.5% and wherein said electrodeposited Co-comprising material after 24 hrs at 37° C. displays a radius of no growth on the zone inhibition test for *salmonella* or *listeria* ranging from 0.5 mm to 50

Accordingly, the invention in another embodiment is directed to an article comprising a metallic Co-bearing layer, having
 (i) a thickness between 5 μm and 2.5 mm;
 (ii) at least one deposit property of said metallic Co-bearing layer selected from the group consisting of chemical composition, grain size, hardness, yield strength, Young's modulus, resilience, elastic limit, ductility, internal stress, residual stress, stiffness, coefficient of thermal expansion, coefficient of friction, electrical conductivity, magnetic coercive force, thickness; and in the case of metal matrix composites, volume particulate fraction particulate particle size, particulate shape and/or particulate chemistry, varied by more than 10% in the layer height direction; and (iii) said metallic layer having a microstructure which is fine-grained with an average grain size between 2 and 5,000 nm and/or amorphous.

Accordingly, the invention in another embodiment is directed to an article comprising:
(i) An electrodeposited metallic material comprising Co having a microstructure which is fine-grained with an average grain size between 2 and 5,000 nm and/or an amorphous microstructure;
(ii) said metallic material forming at least part of an exposed surface of said article;
(iii) said metallic material having an inherent contact angle for water of less than 90 degrees when measured on its flat and smooth surface at room temperature;
(iv) said exposed surface of said metallic material having structures incorporated into at least portions therein to increase the contact angle for water at room temperature to over 100 degrees.

Accordingly, the invention in another embodiment is directed to an article comprising:
(i) a metallic material comprising Co forming at least part of a surface layer of said article having a microstructure which is fine-grained with an average grain size between 2 and 5,000 nm and/or an amorphous microstructure;
(ii) said metallic material at room temperature having a contact angle for water of less than 90 degrees when measured on its smooth surface;
(iii) structures embedded into at least portions of said metallic material surface to raise the contact angle for deionized water at room temperature in said portions by at least 5 degrees.

DEFINITIONS

As used herein, the term "metal", "alloy" or "metallic material" means crystalline and/or amorphous structures where atoms are chemically bonded to each other and in which mobile valence electrons are shared among atoms. Metals and alloys are electronic conductors; they are malleable and lustrous materials and typically form positive ions. Metallic materials include Co—P, Co—B and Co—P—B alloys. Metal compounds, i.e., metal salts including the metal as an ion and not having a valency of 0, bound to another ion, usually an anion, e.g., CoO, $CoCl_2$, $CoSO_4$ and the like are not considered a metallic material within the context of this invention.

As used herein, the terms "metal-coated article", "laminate article" and "metal-clad article" mean an item which contains at least one substrate material and at least one metallic layer or patch comprising Co in intimate contact covering at least part of the surface of said substrate material. In addition, one or more intermediate structures, such as metalizing layers and polymer layers including adhesive layers, can be employed between said metallic layer or patch and said substrate material.

As used herein, the term "metallic coating" or "metallic layer" means a metallic deposit/layer comprising Co applied to part of or the entire exposed surface of an article. The substantially porosity-free metallic coating comprising Co is intended to adhere to the surface of the article to provide mechanical strength, wear resistance, corrosion resistance, anti-microbial properties, non-wetting properties and a low coefficient of friction without reducing the fatigue performance, i.e., without introducing a fatigue debit over either the uncoated substrate or the same substrate coated with Cr of equivalent thickness. Equivalent thickness is defined as less than +/−15% variation between the Co and Cr-bearing coatings thicknesses.

As used herein, the term "metal matrix composite" (MMC) is defined as particulate matter embedded in a fine-grained and/or amorphous metal matrix. MMCs are produced by suspending particles in a suitable plating bath and incorporating particulate matter into the deposit by inclusion. Alternatively, MMCs can be formed by electroplating porous structures including foams, felts, clothes, perforated plates and the like.

As used herein, the term "coating thickness" or "layer thickness" refers to depth in a deposit direction.

As used herein, the term "surface" means a surface located on a particular side of an article. A side of an article may include various surfaces or surface areas, including, but not limited to, a metallic article surface area, a polymer article surface area, a fastener surface area, a seam or joint surface area, etc. Thus, when indicating a coating is applied to a "surface" of an article, it is intended that such surface can comprise any one or all of the surfaces or surface areas located on that particular side of the article being coated.

As used herein, the term "substantially porosity-free," means the metallic coating comprising Co has a porosity of less than 1.5%.

As used herein "coating/layer internal stress" or "internal stress" or "residual stress" means an inherent force in an electrodeposit, which free from any external forces, causes the electrodeposit to be either "compressed" or "stretched". In the compressed stressed condition the deposit has the tendency to expand, whereas in the tensile stressed condition the deposit has the tendency to contract. High internal stresses, i.e., stresses equal to or exceeding 2.5 ksi (compressive or tensile) have heretofore been considered to be undesirable as they have been attributed to compromise corrosion performance due to cracking and flaking and furthermore to also compromise fatigue strength.

As used herein "tensile stress", signified by a positive value, causes the plated strip to bend in the direction of the anode whereas "compressive stress", signified by a negative value, causes the plated strip to bend away from the anode.

As used herein "fatigue" is the progressive and localized structural damage that occurs when a material is subjected to cyclic loading and the "fatigue life" is the number of stress cycles that a specimen can sustain before failure.

As used herein "biocidal agents" refer to agents that are destructive to living organisms, particularly micro-organisms.

As used herein, the "contact angle" or "static contact angle" is referred to as the angle between a static drop of deionized water and a horizontal, flat surface upon which the droplet is placed.

As used herein the "inherent contact angle" or "intrinsic contact angle" is characterized by the contact angle for a liquid measured on a horizontal, flat and smooth surface not containing any surface structures, e.g., a metallic surface obtained by conventional metal forming processes such as casting, rolling, extrusion, electroplating and the like.

According to embodiments of the present invention, a method for manufacturing an article containing fine-grained and/or amorphous Co-bearing metallic materials on at least part of its surface, comprising at least portions with a wetting-resistant surface, is provided. A wetting-resistant surface, in the most common embodiment, exhibits resistance to wetting by water. However, the use of other liquids including organic liquids such as, for example, alcohols, hydrocarbons and the like, are contemplated as well. Unless otherwise indicated, the liquid is deionized water.

As used herein the term "hydrophilic" is characterized by the contact angle for water of <90°, which means that the water droplet wets the surface.

As used herein the term "hydrophobic" is characterized by the contact angle for water of >90°, which means that the water droplet does not wet the surface.

As used herein the term "smooth surface" is characterized by a surface roughness Ra≤0.25 μm.

As used herein "texturing" or "roughening" the surface means that the nature of a surface is not smooth but has a distinctive rough texture created by the surface structures introduced to render the surface fluid repellant.

As used herein, "exposed surface" refers to all accessible surface area of an object accessible to a liquid. The "exposed surface area" refers to the summation of all the areas of an article accessible to a liquid.

As used herein, the term "surface structures" or "surface sites" refers to surface features including recesses, pits, crevices, dents, depressions, elevations, protrusions and the like purposely created in the metallic material, for instance to decrease its wetability and increase the contact angle.

As used herein, the term "population of primary surface structures" refers to number of primary, μm sized, surface features per unit length or unit area. The "linear population of surface sites" can be obtained by counting the number of features, e.g., on a cross sectional image and normalizing it per unit length, e.g., per mm. The average "areal population of surface sites" is the square of the average linear population, e.g., expressed in $cm^2$ or $mm^2$. Alternatively, the average areal density can be obtained by counting the number of features visible in an optical micrograph, SEM image or the like and normalizing the count for the measurement area.

As used herein, "surface roughness", "surface texture" and "surface topography" mean a regular and/or an irregular surface topography containing surface structures. Surface roughness consists of surface irregularities which result from the various surface preconditioning methods used such as mechanical abrasion and etching to create suitable surface structures. These micro-surface irregularities/surface structures, ranging in height, width and depth from 1 to 1,000 μm, combine to form the "primary surface texture" presumably retaining air and are believed to be at least partly responsible for the increase in contact angle/contact angle when compared to a flat surface, particularly, when these features also contain sub-texturing or secondary texturing on the nanoscale, i.e., additional features overlaying the primary structures, which have dimensions ≤100 nm, specifically between 1 and 100 nm.

As used herein, the term "tilt angle" or "roll-off angle" means the smallest angle between a surface containing a water droplet and the horizontal surface at which the droplet commences to and keeps rolling off.

As used herein "unavoidable impurities" refer to elements built into the metallic deposit originating from impurities present in the bath, i.e., substances not purposely added to the electrolyte, e.g., bath chemical impurities (such as Ni in Co salts and in Co soluble anodes; C and O from organic additives; H from organic additives or water reduction), or substances inadvertently introduced into the bath (such as Cu from bus bar corrosion and Fe from corrosion of racking or tank liners). Total unavoidable impurities typically amount to <1% of the metallic deposit.

Metal-coated or free-standing articles of the invention comprise fine-grained and/or amorphous metallic layers comprising Co having a porosity of preferably of equal to or less than 1.5%, a layer thickness of at least 0.010 mm, preferably greater than 0.025 mm, more preferably greater than 0.050 mm and even more preferably greater than 0.100 mm.

Metal-coated or free-standing articles of the invention comprise a single or several fine-grained and/or amorphous metallic layers comprising Co applied to substrates as well as multi-layer laminates composed of alternating layers of fine-grained and/or amorphous metallic layers.

According to one aspect of the present invention, an article is provided by a process which comprises the steps of, positioning the metallic or metalized work-piece to be plated in a plating tank containing a suitable electrolyte and a fluid circulation system, providing electrical connections to the work piece (permanent substrate) or temporary cathode to be plated and to one or more anodes; and plating a structural layer of a metallic material comprising Co with an average grain size of equal to or less than 5,000 nm and/or an amorphous metallic material comprising Co on the surface of the metallic or metalized work piece using suitable direct current (D.C.) or pulse electrodeposition processes described, e.g., in the co-pending application published as US 2005/0205425. In addition to tank plating, other approaches such as drum-, barrel- and brush-plating are contemplated as well.

The bond achieved between the metallic coating comprising Co and the surface of the article/substrate should be configured to be as strong as possible. The bond should be strong to avoid crack formation, delamination and/or blistering during use and/or during temperature cycling. Moreover, in the case of applying metallic patches comprising Co, the bond should be particularly strong around the edges of the metallic coating to ensure the metallic coating does not separate from the surface of the substrate. In the case of metallic substrates suitable surface preparation methods include degreasing, mechanical abrasion and/or chemical etching. In the case of polymeric substrates suitable surface preparation methods include mechanical abrasion, swelling and/or chemical etching and metalizing.

According to this invention, an entire article can be coated, i.e., encapsulated with a metallic layer comprising Co. Alternatively, metallic patches or sections can be formed on selected areas of the article only, without the need to coat the entire article.

According to this invention metallic patches or sleeves comprising Co are not necessarily uniform in thickness, microstructure and composition and can be deposited in order to, e.g., enable a thicker coating on selected sections or sections particularly prone to heavy use, erosion or wear.

The following listing further defines the article of the invention:

Substrate Specification:

Preferred substrates for the application for the Co-comprising fine-grained and/or amorphous coatings include Fe based alloys (ferrous alloys). Particularly suited steels include carbon steels (e.g., 1000 series), alloy steels (e.g., 4000, 8000, 9000 series) and stainless steels (e.g., 300, 400, 600 series). Suitable substrates further include Al, Co, Cu, Cr, Fe, Ni, Sn, Ti, W, Zn-based substrates and alloys of two or more of these metals including brass and bronze. Suitable substrates can also include non-metallic materials including, but not limited to, ceramics and polymers.

Co Bearing Metallic Coating/Layer Specification:
Mechanical and Other Relevant Properties:

| Microstructure: | Amorphous or crystalline |
|---|---|
| Minimum average grain size [nm]: | 2; 5; 10 |
| Maximum average grain size [nm]: | 100; 500; 1,000; 5,000 |
| Metallic Layer Thickness Minimum [μm]: | 5; 10; 25; 30; 50; 100 |
| Metallic Layer Thickness Maximum [mm]: | 2.5; 25; 50 |
| Minimum Yield Strength [MPa]: | 300 |
| Maximum Yield Strength [MPa]: | 2,750 |
| Minimum Hardness [VHN]: | 100; 200; 400 |
| Maximum Hardness [VHN]: | 1,000; 2,000; 3,000 |
| Minimum Porosity [%]: | 0; 0.01 |
| Maximum Porosity [%]: | 0.75; 1; 1.5 |
| Minimum Ductility [%]: | 0.01; 0.1; 0.5 |
| Maximum Ductility [%]: | 15; 25; 35 |
| Minimum Coefficient of Friction: | 0.01 |
| Maximum Coefficient of Friction: | 1 |
| Minimum deposit stress/tensile or compressive [ksi]: | 2.5; 5; 10 |
| Maximum deposit stress/tensile or compressive [ksi]: | 15; 20; 25; 30 |
| Minimum Zone of Inhibition Radius after 24 hrs at 37° C. [mm]: | 0.1; 0.5; 1 |
| Maximum Zone of Inhibition Radius after 24 hrs at 37° C. [mm]: | 5; 10; 50 |

Co Bearing Metallic Coating/Layer Surface Specification:

| | |
|---|---|
| Minimum contact angle on smooth surface for deionized water at room temperature [°]: | 0, 25, 50 |
| Maximum contact angle on smooth surface for deionized water at room temperature [°]: | 87, 90 |
| Minimum contact angle on textured surface for deionized water at room temperature [°]: | >90, 100, 105; 110; 120; |
| Maximum contact angle on textured surface for deionized water at room temperature [°]: | 160, 180 |
| Minimum increase in contact angle for deionized water at room temperature of the modified surface when compared to the flat & smooth surface of the same composition [°]: | 5, 10, 20, 30, 40 |
| Maximum contact angle for deionized water at room temperature [°]: | 50, 90 |
| Minimum linear population of micron-sized surface structures [number per mm]: | 5, 10 |
| Maximum linear population of micron-sized surface structures [number per mm]: | 100; 1,000 |
| Minimum areal population of micron-sized surface sites [number per mm$^2$]: | 10, 25, 100 |
| Maximum areal population of micron-sized surface sites [number per mm$^2$]: | 5,000; 10$^5$; 10$^6$ |
| Minimum micron-sized surface structure diameter, height/depth or spacing [μm]: | 1; 5; 10 |
| Maximum micron-sized surface structure diameter, height/depth or spacing [μm]: | 50; 100; 250; 500; 1,000 |
| Surface structure topography: | recesses; cavities; pitted surface structures; holes; pores; depressions; grooved, roughened and etched surface sites; or open foam type structures; "brain", "cauliflower", "worm", "coral", elevations, protrusions and other three dimensionally interconnected porous surface structures |
| Minimum ultra-fine-sized secondary surface structure diameter [nm]: | <1, 1, 2 |
| Maximum ultra-fine-sized secondary surface structure diameter [nm]: | 50, 75, 100 |

Composition:

| | |
|---|---|
| Minimum Co material content [%]: | 5; 10; 25; 50, |
| Maximum Co material content [%]: | 90; 95; 97.5; 100, |
| | Metallic Materials comprising Co optionally are alloyed with one or more elements selected from the group of: Ag, Al, Au, Cr, Cu, Fe, Ni, Mo, Pd, Pt, Rh, Ru, Sn, Ti, W, Zn and Zr. |
| Other alloying additions: | B, C, H, O, P and S |
| Particulate additions: | metals (Ag, Al, In, Mg, Si, Sn, Pt, Ti, V, W, Zn); metal oxides (Ag$_2$O, Al$_2$O$_3$, CoO, CuO, In$_2$O$_3$, MgO, NiO, SiO$_2$, SnO$_2$, TiO$_2$, V$_2$O$_5$, ZnO); carbides and nitrides of Al, B, Cr, Bi, Si, W; carbon (carbon nanotubes, diamond, graphite, graphite fibers, Buckminster Fullerenes); glass; polymer materials (PTFE, PVC, PE, PP, ABS, epoxy resins) and self lubricating materials such as MoS$_2$. |
| Minimum particulate fraction [% by volume]: | 0; 1; 5; 10 |
| Maximum particulate fraction [% by volume]: | 50; 75; 95 |

Electrodeposition Specification for the Co-Comprising Material:

| | |
|---|---|
| Minimum Deposition Rates [mm/hr]: | 0.025; 0.05; 0.1 |
| Maximum Deposition Rates [min/hr]: | 0.5; 1; 2 |
| Minimum Agitation Rates [1/(min × cm$^2$ anode or cathode electrode area)]: | 0.01; 0.1 |
| Maximum Agitation Rates [1/(min × cm$^2$ anode or cathode electrode area)]: | 7.5; 10 |

Intermediate Structure Specification:
Electroless and electroplated Ni, Co, Cu, Zn, Sn and/or Ag comprising coatings
Metal-Coated Article Specification:
The yield strength and/or ultimate tensile strength of the metal-coated article exceed 25 MPa, preferably 100 MPa and can be as high as 5,000 MPa. The coating comprising Co represents between 0.001%-100% of the total weight of the article.
Fatigue Performance:
Minimum fatigue performance ratio between the cycle life of the coated and either the uncoated substrate or the equivalent thickness Cr coated substrate when tested at a coating thicknesses range of between 5 μm and 250 μm and up to 2.5 mm, at stress levels of between ⅓ and ⅔ of the yield strength of the substrate, preferably at stress levels around ½ of the yield strength: 1.00 (equivalent to either the uncoated substrate or the equivalent thickness Cr coated substrate), preferably 1.01 times the fatigue cycle life of either the uncoated substrate or the equivalent thickness Cr coated substrate (1% increase in fatigue resistance). Equivalent thickness is defined as less than +/−15% variation between the Co and Cr-bearing coatings thicknesses.

Maximum fatigue performance ratio between the cycle life of the coated and either the uncoated substrate or the equivalent thickness Cr coated substrate: 10.0 (10 times the life cycle number of either the uncoated substrate or the equivalent thickness Cr coated substrate under otherwise identical conditions), preferably 100 and more preferably 1,000 the cycle life of either the uncoated substrate or the equivalent thickness Cr coated substrate.

The fatigue performance can be determined using one of the following fatigue tests:

ASTM E466: *Standard Practice for Conducting Force Controlled Constant Amplitude Axial Fatigue Tests of Metallic Materials*

E606: *Standard Practice for Strain-Controlled Fatigue Testing*

ISO 1099: *Metallic Materials—Fatigue Testing—Axial Force-Controlled method*

ISO 12106: *Metallic Materials—Fatigue Testing—Axial-Strain-Controlled method*

ISO 1143: *Metals—Rotating Bar Bending Fatigue Testing.*

The person skilled in the art will know that, in addition to various standardized axial and bending (cantilever bend and rotating) fatigue tests, a large number of "special" fatigue tests including, but not limited to, torsional, rolling contact, gear tests, are being used and at times performed under special environmental conditions, which are all within the scope of this invention.

Thermal Cycling Performance:

Minimum thermal cycling performance according to ASTM B553-71: 1 cycle according to service condition 1 without failure (no blistering, delamination or <2% displacement) and with <2% displacement between the polymer and metallic layer. Maximum thermal cycling performance according to ASTM B553-71: infinite number of cycles according to service condition 4 without failure.

The following description highlights a number of relevant test protocols applicable to determining the properties of the Co-bearing metallic materials:

Porosity Test Specification:

To determine the porosity, samples are polished to a 1 μm diamond polish and imaged in a light microscope to 400× magnification. The % porosity is determined using image analysis, e.g., ImageJ (Image Processing and Analysis in Java provided by the US NIH at http://rsbweb.nih.gov/ij/) relating the area fraction of pores, cracks, pits etc. to the total surface of the samples.

This method is preferred over measuring the porosity of less than 25 μm thick electrodeposits on steel substrates by applying an acidified copper sulfate solution to the plated areas as commonly used for Cr coatings. The pores permit the solution to copper coat steel by displacement, and the degree of copper coating thus indicates the degree of porosity. This test is unsuitable for use with Co-containing coatings.

Internal Stress Test Specification:

It is well known that most electrodeposits exhibit either tensile or compressive stresses as outlined, e.g., Stein, AESF Electroforming Symposium, Mar. 27-29, 1996, Las Vegas, Nev. The most popular measurement technique used is the bent strip method which uses two-legged brass strips whose opposite sides are plated and the resulting leg deflection caused by deposit stress is measured. Other measurement techniques can be used including, but not limited to, the spiral contractometer, stressometer, x-ray, strain gauge, dilatometer, hole drilling and holographic interferometry.

Fatigue Test Information:

Fatigue testing involves the application of dynamic and fluctuating cyclic stresses to a material or article. The applied stresses are typically lower than the tensile or yield strength of the material. To evaluate the effects of a coating on the fatigue performance of a substrate material, the coating is applied to at least a portion of the gauge length of the test specimen prior to testing.

A number of test methods exist for evaluating the fatigue performance of materials. Of these, the most common are axial and rotating bending configurations. ASTM E466 (*"Standard Practice for Conducting Force Controlled Constant Amplitude Axial Fatigue Tests of Metallic Materials"*) is an example of a test procedure that describes the axial fatigue test method that is stress controlled. ASTM E606 (*"Standard Practice for Strain-Controlled Fatigue Testing"*) is an example of a test procedure that describes axial fatigue test method that is strain controlled. ISO 1143 (*"Metals—Rotating Bar Bending Fatigue Testing"*) is an example of a test procedure describing the rotating bending fatigue test method.

Thermal Cycling Test Specification:

ANSI/ASTM specification B604-75 section 5.4 Test (*"Standard Recommended Practice for Thermal Cycling Test for Evaluation of Electroplated Plastics ASTM B553-71"*) is used. In this test the samples are subjected to a thermal cycle procedure as indicated in Table 1. In each cycle the sample is held at the high temperature for an hour, cooled to room temperature and held at room temperature for an hour and subsequently cooled to the low temperature limit and maintained there for an hour.

TABLE 1

Standard Recommended Practice for Thermal Cycling Test for Evaluation of Electroplated Plastics According to ASTM B553-71

| Service Condition | High Limit [° C.] | Low Limit [° C.] |
| --- | --- | --- |
| 1 (mild) | 60 | −30 |
| 2 (moderate) | 75 | −30 |
| 3 (severe) | 85 | −30 |
| 4 (very severe) | 85 | −40 |

If any blistering, delamination or cracking is noted the sample is considered to have failed and the test is immediately suspended. After 10 such test cycles the sample is allowed to cool to room temperature, is carefully checked for delamination, blistering and cracking and the total displacement of the coating relative to the substrate is determined.

Zone of Inhibition Test Specification:

The effects of microstructural refinement of Co-comprising metallic materials compared to stainless steel (Type 304) and conventional coarse-grained pure Co (>10 μm grain size) on the bacterium *salmonella typhimurium* and *listeria monocytogenes* were determined by the zone inhibition test adapted from the "Parallel Streak Method AATCC Test Method 147-2004". In this test metal samples (1 cm$^2$) are sterilized in 80% ethanol for 10 minutes, followed by 10 minutes under ultraviolet light. Bacteria (*Listeria monocytogenes* 10403S and *Salmonella typhimurium* SL1344) are grown overnight in 5.0 ml of broth (brain heart infusion (BHI) media for *Listeria monocytogenes* and Luria-Bertani (LB) media containing 50 mg/ml streptomycin for *Salmonella typhimurium*) at 37° C. with shaking. 1.0 ml of the overnight culture is diluted in 9.0 ml of sterile distilled water. An inoculating loop is flamed and loaded with the diluted inoculum, and 5 parallel streaks of ~5-6 cm are made on a sterile agar plate of the appropriate media without refilling the loop (1 plate/sample). The test sample plate is then placed to cover the 5 streaks and pressed gently into the media to ensure contact. The plates are incubated for 24 hours at 37° C. and the diameter of no growth measured. The diameter of the sample itself is subtracted from the diameter of no growth. The resulting difference is divided by 2 to get the radius of the zone of inhibition (mm).

BRIEF DESCRIPTION OF THE DRAWINGS

In order to better illustrate the invention by way of examples, descriptions are provided for suitable embodiments of the method/process/apparatus according to the invention in which:

FIG. 5a illustrates a picture of a water droplet (contact angle 148°) on a patterned fine-grained Co—$Al_2O_3$-graphite metal matrix composite-surface (average grain size: 25 nm) according to the invention using shot-peening, followed by chemical etching, to suitably roughen the outer surface. FIG. 5b depicts a magnified image of the patterned fine-grained Co—$Al_2O_3$-graphite surface.

FIG. 6a illustrates a picture of a water droplet (contact angle 132°) on a patterned amorphous Co-9P surface according to the invention using shot-peening, followed by chemical etching, to suitably roughen the outer surface. FIG. 6b depicts a magnified image of the patterned amorphous Co-9P surface.

DETAILED DESCRIPTION

Figures 1, 2:
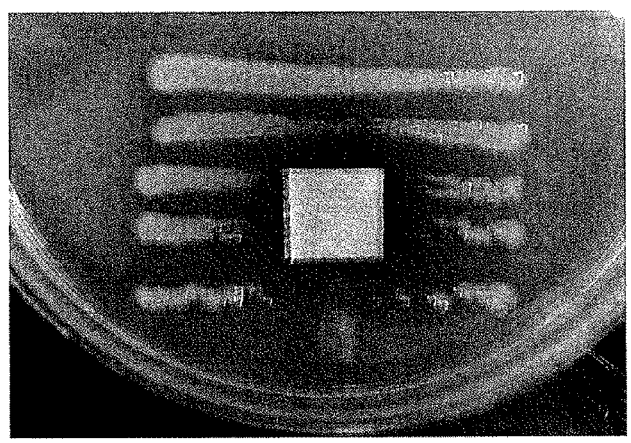
FIG. 1 illustrates pictures of an engineered hard Cr coating and a fine grained Co-comprising coating according to this invention including the image analysis used to determine the porosity.
FIG. 2 shows a picture of a zone of inhibition test for nanocrystalline Co-2P.
Figure 3A:
FIG. 3a illustrates a picture of a water droplet (contact angle 89°) on a patterned coarse-grained Co-surface (average grain size: 15 μm) using shot-peening, followed by chemical etching.
Figure 3B:
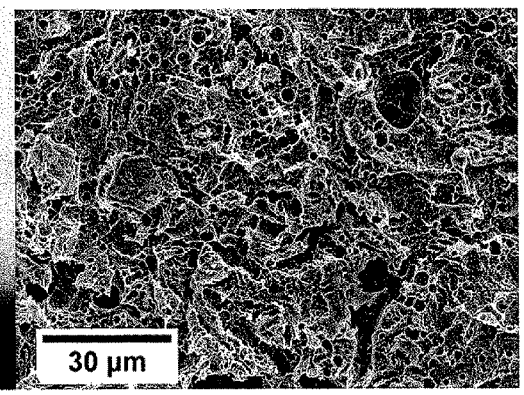
FIG. 3b depicts a magnified image of the patterned coarse-grained Co surface.
Figure 4A:
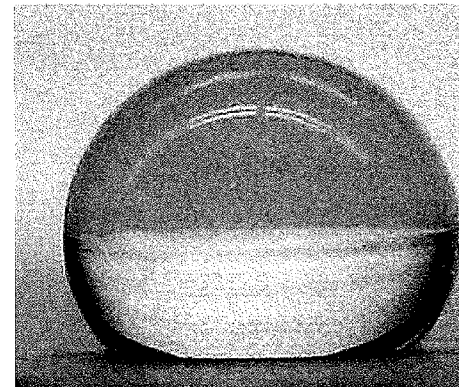
FIG. 4a illustrates a picture of a water droplet (contact angle 144°) on a patterned fine-grained Co-surface (average grain size: 15 nm) according to the invention using shot-peening, followed by chemical etching, to suitably roughen the outer surface.
Figure 4B:
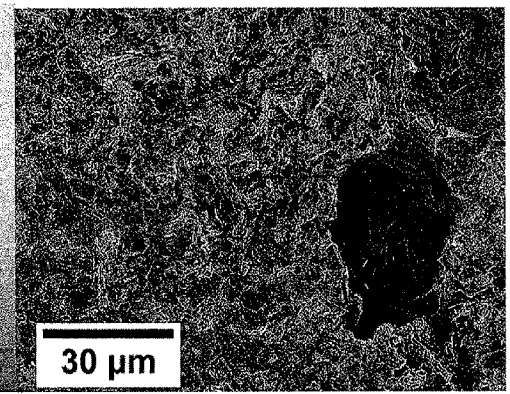
FIG. 4b depicts a magnified image of the patterned fine-grained Co surface.

This invention relates to articles formed by electrodeposition by applying conforming, substantially porosity free, Co-bearing metallic layers having a fine-grained and/or amorphous microstructure to permanent or temporary substrates. Compared to Cr coatings a significant reduction in energy consumption and significant increases in coating throughput can be achieved with electrodeposited coatings/layers comprising Co metallic materials, alloys and metal matrix composites. The overall plating efficiency of the Co-comprising coatings/layers using an electrodeposition process ranges from 75% to 99%, compared to less than 35% for Cr. Furthermore, Co-comprising coatings/layers can be deposited at high deposition rates, ranging from five to twenty times typical Cr deposition rates.

Unlike conventional Co based coatings which have an average grain size exceeding 10 microns, fine-grained Co-comprising coatings of this invention have a preferred average grain size in the range of 2 to 5,000 nm, more preferably, 2 to 1,000 nm and even more preferably 5 to 500 nm. Amorphous and mixed amorphous/fine-grained microstructures are contemplated as well. The microstructure is suitably selected to provide the optimum combination of strength and ductility.

As a result of Hall-Petch strengthening, Co-bearing alloys display significant increases in hardness and strength relative to their coarser grained counterparts. Through a precipitation hardening mechanism, a further increase in hardness can be obtained in selected Co bearing alloys including, but not limited to Co—P, Co—B and Co—P—B alloy and MMC coatings/layers, by annealing the as-deposited material to induce the precipitation of Co-phosphides and/or Co-borides from the supersaturated solid solution at elevated temperatures.

Due to safety concerns a number of applications including, but not limited to, transportation, require high reliability and the application of metallic coatings. Parts used on external motor vehicle, aircraft or ship parts are prone to impact damage, e.g., by rain, snow or hail; sand or other debris; other airborne objects including birds and/or thermal cycling degradation in outside service.

Similarly, the application of strong, well bonded, substantially porosity-free, conforming, metallic coatings comprising Co to the surface of parts can be used to restore worn or otherwise degraded parts. When initiating the repair the area to be treated is typically first "under-dimensioned" by removing some surface material to account for the thickness of the coating to be eventually added. The affected area is thereafter roughened, preferably by mechanical abrading, grit blasting, and/or chemical or plasma etching. The under-dimensioned area is then optionally metalized and finally restored to at least its original dimension by applying the conforming metallic layer comprising Co. After the metallic Co-bearing coating has been applied, the metallic coating can be ground or machined back to the proper original dimensions of the tool. Suitable finishing processes including milling, grinding, drilling, sanding, and polishing.

Preferred embodiments of this invention therefore relate to enhancing the durability and structural integrity of new or worn parts/components by applying the conforming metallic coating comprising Co. The electrodeposition method used comprises (a) suitably preparing/activating a surface of the part/component to receive a metallic coating thereon; (b) optionally applying one or more electricity conductive intermediate structures or layers to the surface of the part/component to receive the electrodeposited coating selected from the group consisting of a primer, an adhesive layer, an intermediate metallic layer, a conductive paint; and (c) applying one or more fine grained and/or amorphous metallic coating(s) comprising Co to part, or all of the surface of the part/component, by DC or pulse electrodeposition.

After electrodeposition, where appropriate, the metallic coating can be suitably exposed to a finishing treatment such as polishing including electropolishing, alternatively surface roughening, e.g., to enhance the contact angle, provide for ease of gripping/holding, can be suitable applied to at least portions of the outer surface. Furthermore, additional coatings, i.e., "top coats", can be applied which can include, among others, electroplating, i.e., metal plating and/or applying polymeric top coats such as paints. In applications requiring good wear, friction, anti-bacterial performance, the Co-comprising fine-grained and/or amorphous coating preferably forms the outer most surface.

Electroplating/Electroforming Description:

The electroplating process for plating or refurbishing a suitable article includes the steps of (i) providing a part including a substrate having one or more surfaces to be plated, (ii) degreasing the surface(s) of the part and, if desired, masking selected areas of the surface(s) not to be plated, (iii) activating the surface(s) to be plated and (iv) optionally applying intermediate layers and (v) suitably coating the surface(s) to be coated with one or more layers of fine-grained and/or amorphous Co-comprising metallic material.

To enhance the bond between the Co-bearing coating and, e.g., a steel substrate, the steel substrate is typically cleaned before applying one or more coatings. The steel surface(s) to be plated is(are) degreased and cleaned using one or more of the processes selected from the group of vapor degrease, solvent wipe, as well as aqueous or solvent based (e.g., ketones, alcohols) degrease, applying dry abrasives, alkaline cleaners and electrocleaning. Surfaces not to be coated can be suitably masked using lacquers, rubber-based coatings, hard masks and tapes. The surface of the substrate to be plated can be shot peened using an abrasive material including glass bead, steel shot or aluminum oxide, optionally followed by alkaline to cleaning or an electrolytic "electro-clean" process using DC or AC.

The substrate is suitably activated using a mineral acid etch, a plasma or oxidizing gas etch, and/or other surface preparation methods well known in the art. The pretreatment process steps and conditions are varied depending on the chemical composition of the substrate and are comparable to the pretreatment steps used in Cr or Ni plating processes.

Optionally, one or more thin layers called "intermediate conductive layers or structures" can be applied prior to applying one or more Co-bearing coatings of the invention. The intermediate conductive layers or structures include metallic layer comprising Co-, Ag-, Ni-, Zn-, Sn- or Cu-strikes or a combination of any two or more of these, and the intermediate conductive layer or structure can be deposited by electrodeposition, electroless deposition, sputtering, thermal spraying, chemical vapor deposition, physical vapor deposition of by any two or more of these. Intermediate conductive layers are required for non-conductive substrates, such as polymers and are frequently referred to as "metalizing layers".

In the case of electroforming a temporary substrate is chosen so the metallic Co-comprising layer can be readily removed after plating. Suitable temporary substrates include metallic substrates such as polished titanium surfaces (followed, e.g., by mechanical removal), as well as organic substrates such as conductive waxes (followed typically by melting the temporary substrate).

A person skilled in the art of plating will know how to generally electroplate selected fine-grained and/or amorphous metals, alloys or metal matrix composites choosing suitable plating bath formulations and plating conditions. Specifically to fine-grained and/or amorphous coatings comprising Co of this invention a number of process variables need to be closely controlled in order to achieve the desired properties outlined in this invention. In the case of tank plating, the part(s) to be plated are submerged into a Co-ion containing plating solution; providing one or more dimensionally stable anode(s) (DSA) or one or more soluble anode(s) and optionally one or more current thieve(s) and/or shield(s) submersed in the Co-ion bearing plating solution; providing for electrical connections to the cathode(s), current thieve(s) and anode(s) and applying direct and/or pulsed current to coat the surface of the part with a Co-bearing coating; removing the part from the tank, washing the part; optionally baking the plated part to reduce the risk of hydrogen embrittlement and/or heat treating the part to harden the substrate and/or the Co-bearing coating/layer; optionally polishing/buffing or roughening the surface and optionally applying other coatings, e.g., protective paints, hydrophobic polymer coatings or waxes.

Dimensionally stable anodes (DSA) or soluble anodes can be used. Suitable DSAs include platinized metal anodes, platinum clad niobium anodes, graphite or lead anodes or the like. Soluble anodes include Co metal or Co alloy rounds, chips, wires and the like, e.g., placed in suitable anode basket made out of, e.g., Ti, and preferably covered by suitable anode bags. Where possible, the use of soluble anodes is preferred as, unlike when using DSAs, Co-ions lost from the electrolyte through reduction to the coating on the cathode get replenished by Co rounds which are anodically dissolved. Further benefits of using soluble anodes include a substantial reduction in the cell voltage due to the potential difference between Co-oxidation and oxygen evolution and much simpler bath maintenance.

Specifically preferred Co-bearing plating solutions include one or more Co-bearing compounds including cobalt sulfate ($CoSO_4.6H_2O$) cobalt chloride ($CoCl_2.6H_2O$) and cobalt carbonates ($CoO_3.H_2O$; $2CoCO_3.3Co(OH)_2.H_2O$) with a preferred concentration range of $Co^{++}$ ion between 10 g/L (or mol/L) and 100 g/L (or mol/L). Other salts can be used as sources for the Co metal ions including, but not limited to, citrates and phosphates.

The Co-ion bearing plating solution optionally contains P-ions, e.g., as phosphorous acid ($H_3PO_3$) and/or phosphate, e.g., as phosphoric acid ($H_3PO_4$), with a P concentration in the range of between 0.5 to 100 g/L or mol/L. Phosphites and phosphates may be added to the Co-bearing plating to enable the formation of Co—P alloy deposits to provide for the phosphate/phosphite equilibrium, and to maintain the pH value of the plating solution, e.g., as phosphoric acid, Co phosphate or sodium phosphate.

The Co-bearing plating solution also typically contains one or more additives selected from the group of surfactants, brighteners, grain-refiners, stress-relievers, salts to raise the ionic conductivity and pH adjusters. Stress-controlling agents and grain-refiners based on sulfur compounds such as sodium saccharin may be added in the range of 0 to 10 g/L to control the grain-size/hardness and the stress. Other suitable grain refiners/brighteners include borates and/or perborates in the concentration range of between 0 and 10 g/L of B. Sodium, potassium or other chlorides can be added to increase the ionic conductivity of the plating solution which may also act as stress relievers.

A preferred range for the pH value of the plating solution is between 0.9 and 4. The surface tension of the Co-ion plating solution having the above described composition may be in a preferred range of 30 to 100 dyne/cm. A preferred temperature range of the plating solution is 20 to 120° C.

When using soluble anodes Co-ion depletion is prevented by using Co rounds as soluble anodes, e.g., retained in Ti anode baskets, otherwise Co-ion depletion is prevented by suitable bath additions. The anode area is typically larger than the cathode area to be plated, preferably by between 10 and 100% taking into account the total surface area of the Co-rounds or Co-chips contained in, e.g., the Ti-anode baskets.

After suitably contacting one or more anodes and one or more parts serving as cathode(s), direct or pulsed current (including the use of one or more cathodic pulses, and optionally anodic pulses and/or off times) is applied between the cathode(s) and the anode(s). A suitable duty cycle is in the range of 25% to 100%, preferably between 50 and 100% and suitable applied average cathodic current densities are in the range of 50 to 300 $mA/cm^2$, preferably between about 100 and 200 $mA/cm^2$. This results in deposition rates of between 0.025 and 0.5 min/h. Agitation rates can also be used to affect the microstructure and the deposit stress and suitable agitation rates range from about 0.01 to 10 liter per minute and effective cathode or anode area ($L/(min \cdot cm^2)$) to from about 0.1 to 300 liter per minute and applied Ampere ($L/(min \cdot A)$).

Anodic pulsing can be employed as well, e.g. to avoid edge effects and obtain a more uniform thickness distribution on parts with complex geometry and/or to control the grain size. The microstructure (grain size or amorphous deposits) can furthermore be affected by a number of variables including, but not limited to, the bath chemistry, the electrical wave forms, cathode surface flow conditions and bath temperature.

By using the electrodeposition process described, Co-comprising coatings can be produced which are ductile, free of cracks, and possess sufficient hardness and residual stress to meet wear and fatigue requirements for wear-resistant coatings. Preferred Co-comprising coatings comprise Co in the range of about 75 to 100 weight percent; P in the range of about 0 to 25 weight percent; W in the range of about 0 to 25 weight percent; boron in the range of about 0 to 10 weight percent. Embedded in the fine-grained and/or amorphous Co-comprising coating can be one or more particulates representing between 0-50% per volume of the total metal matrix composite. Where desired, the addition of Ni salts to the bath yield Co—Ni bearing alloys, Fe salt additions result in Co—Fe bearing alloys and Ni and Fe salt additions result in the deposition of Co—Ni—Fe bearing alloys.

Using the process described with Co salts and $H_3PO_3$ additions to the bath, a preferred Co-comprising coating deposited onto a steel substrate (4340) using DC or pulse plating contains Co with 2±1% per weight of P and unavoidable impurities totaling less than 1% of the total weight with an average grain size in the 5-50 nm range and a internal deposit tensile stress of 15±5 ksi and an as-deposited Vickers hardness of 570±40 VHN. The coating was applied at a thickness of 50 microns. To prevent hydrogen embrittlement the deposit can be heat-treated for at least 12 hours, preferably 24 hrs at a temperature range of between 175-200° C. Optionally a further heat-treatment at temperatures ranging between 200 and 450° can be employed to increase the deposit Vickers hardness to 640±40. Similarly fine-grained, amorphous, mixed fine-grained and amorphous metallic layers comprising various compositions including, but not limited to, Co—P, Co—P—B, Co—Fe, Co—Fe—P, Co—Ni, Co—Ni—P, Co—Ni—P—B, Co—Ni—W, Co—W and Co—W—P with and without the addition of particulates can be synthesized.

Internal Coating Stress:

It is also well documented that internal stress is perhaps the most integral characteristic of an electrodeposition system and the internal stress of a coating is affected by a large number of variables including, but not limited to, the current density; concentration of every major component of the plating bath (metal salts, conductive salts, buffering agents, etc.); concentration of additives (organic or inorganic wetting agents, grain refiners, brighteners); concentration of impurities (chemical or particulate), including trace amounts; bath temperature; agitation rate; solution pH; plating cell geometry; composition and condition of anodes; anode/cathode surface area ratio; thickness of the deposit, quality of DC power (ripple) and, where applicable, pulsing conditions; and nature and condition of the substrate;

It is known that tight process control needs to be applied to suitably control stress and furthermore that it is of paramount importance to measure stress directly in the plating tank rather than attempt to recreate the same conditions in a laboratory cell.

Specific to fine-gained and/or amorphous coatings comprising Co in general an internal stress in the range of from 2.5 to 30 ksi is desired and, e.g., specifically to fine-grained Co-2±1% P layers/coatings according to a preferred embodiment of the present invention a desired stress is +15±5 ksi (tensile).

Porosity:

When suitably adjusting the deposition conditions, the porosity of fine-grained and/or amorphous metallic coatings comprising Co can be maintained below 1.5%, typically below 1%. As an example, porosity values determined as described above are 0.1% for fine-grained Co-2±1% P (grain size: 15 nm; internal stress: +15 ksi) compared to 1.6% for EHC as is illustrated in FIG. 1. Specifically FIG. 1 shows optical microscopy pictures of hard Cr and the Co-2P coatings, as well as the high contrast images derived thereof using commercial imaging software, which are the images used to determine the actual porosity values. It is well known that a number of properties of coatings is compromised by porosity, which in the case of electrodeposited coatings, includes pores, voids, cracks and the like introduced during the coating deposition and/or formed thereafter due to the inherent stress in the deposit or induced by stress, wear and/or corrosion. It is observed that the porosity of a coating is not necessarily exclusively an "inherent material property" as the porosity of a coating layer is usually affected by the deposition conditions, the coating thickness (thicker coatings tend to have lower porosity) and the substrate topography/texture/roughness, i.e., in the case of very thin coatings the substrate topography predominantly determines the coating porosity.

Anti-Microbial/Anti-Bacterial Properties:

It is well known that over 80% of infectious diseases are transmitted by touch and while stainless steel and aluminum doorknobs, plates, counter tops, sinks, etc. appear to be clean they can harbor deadly microbes. Metallic antimicrobial coatings can maintain the antimicrobial properties over the life of the product and not suffer deterioration when scratched or damaged. It is well known that silver and copper alloys provide antimicrobial properties; however, these metals and their alloys are relatively soft and could not be employed in applications requiring wear resistance equivalent to, e.g., hard Cr.

Anti-microbial properties of Co-comprising coatings were investigated using zone of inhibition testing. The test protocol for the zone of inhibition test includes growing selected bacteria overnight, streaking them onto a semi-solid organic media plate, followed by placing a 1 cm$^2$ metal sample on the bacteria streaks and holding the sample at 37° C. for 24 hrs. Thereafter, the distance the bacteria streak has receded away from the edge of the metal sample is measured and this distance denotes the "radius of no growth"/"zone of inhibition".

The Luria-Bertani media was used for testing for *salmonella* which included: 10 g/L NaCl, 10 g/L tryptone, 5 g/L yeast extract, 15 g/L agar dissolved in sterile distilled water; pH 7.0-7.2. The Brain Heart Infusion (BHI) media was used for testing for *Listeria* which included 37 g/L BHI and 15 g/L agar dissolved in sterile distilled water, pH 7.0-7.2.

The fine-grained Co-2P (average grain size between 5 and 25 nm; internal stress: +15±5 ksi) had a no-growth distance similar to Cu and displayed a characteristic large brown halo as illustrated in FIG. 2 for *Salmonella*. Table 2 summarizes the zone of inhibition test results for a number of metallic materials.

TABLE 2

Zone of Inhibition test results after 24 hrs exposure at 37° C. to *salmonella* and *listeria* for a number of metallic materials.

| | Zone of Inhibition [mm] | | | |
|---|---|---|---|---|
| Bacteria | 304 Steel | OFHC Cu | Co (coarse grained) | Co-2P (5-25 nm) |
| Salmonella typhimurium | ~0 | ~0.2 | ~0 | 3.7 |
| Listeria monocytogenes | ~0 | ~1.0 | ~0 | 1.9 |

Adhesion:

When suitably pretreated, excellent bond strengths of fine-grained and/or amorphous metallic coatings comprising Co in general, and fine-grained Co-2±1% P in particular, are achieved. In bend tests conducted in accordance with ASTM 13571, no signs of peeling or delamination are observed between the Co-comprising coating and the substrate at low (10×) magnification. In testing conducted in accordance with ASTM B553-71, service conditions 1 through 4, samples coated with fine-grained and/or amorphous metallic coatings comprising Co passed 30 thermal cycles without delamination and the displacement of the coating relative to the underlying substrate is substantially zero.

Fatigue Life:

As highlighted previously electrodeposited coatings are known from the scientific and patent literature to compromise the fatigue performance, particularly at high deposit internal stress levels. It has now been surprisingly found that electroplated fine-grained and/or amorphous coatings comprising Co in general and fine-grained Co-2±1% P in particular do not adversely affect the fatigue performance and, at times, even provide a fatigue benefit (fatigue credit). Table 3 illustrates fatigue data obtained with uncoated and a Co-coated AISI heat-treatable 4340 low-alloy steel substrates (hardness: RC 49-56, yield strength: 1,790-1,930 MPa) tested at roughly 56% of the yield strength of the steel (1,035 MPa) and Table 4 illustrates fatigue data obtained with equivalent thickness Cr and a Co-coated AISI heat-treatable 4340 low-alloy steel substrates. Specifically, the steel was coated with 50 μm Co-2P with an average grain size of about 5-25 nm and a tensile stress of +15±2 ksi and an as-deposited hardness of VHN570±40. No shot peening was performed. As fatigue performance can vary significantly each data point represents an average of five test samples. Cr coated samples were prepared using conventional EHC technology. Table 5 illustrates fatigue data obtained on various test specimen using AISI heat-treatable 4340 low-alloy steel substrates.

TABLE 3

Fatigue Performance for Uncoated and 50 μm Thick Fine-Grained Co-2P Coated 4340 Steel.

| | Number of Fatigue Life Cycles to Failure at an Applied Stress of 1035 MPa (=150 ksi) | | |
| --- | --- | --- | --- |
| Fatigue Test | Uncoated 4340 Steel | 4340 coated with a 50 μm thick Co-2P coating (grain size: 15 nm, internal stress: +15 ksi) | Ratio between the number of cycles of the coated versus the uncoated test specimen |
| Axial Fatigue ASTM E466 | 43,000 | 43,500 | 1.01 |
| Rotating Beam Fatigue ISO 1143 | 23,000 | 60,000 | 2.61 |

TABLE 4

Fatigue Performance for 50 μm Thick Cr and Fine-Grained Co-2P Coated 4340 Steel.

| | Number of Fatigue Life Cycles to Failure at an Applied Stress of 1035 MPa (=150 ksi) | | |
| --- | --- | --- | --- |
| Fatigue Test | 4340 coated with a 50 μm thick Cr coating | 4340 coated with a 50 μm thick Co-2P coating (grain size: 15 nm, internal stress: +15 ksi) | Ratio between the number of cycles of the coated versus the uncoated test specimen |
| Axial Fatigue ASTM E466 | 7,000 | 43,500 | 6.21 |
| Rotating Beam Fatigue ISO 1143 | 10,000 | 60,000 | 6.00 |

TABLE 5

Axial Fatigue Performance for Uncoated, Cr and Co-Bearing Coated 4340 Steel.

| | Number of Fatigue Life Cycles to Failure at an Applied Stress of 1035 MPa (=150 ksi) Using Axial Fatigue ASTM E466 | Ratio between the number of cycles of the test specimen versus the uncoated test specimen | Ratio between the number of cycles of the test specimen versus the Cr coated test specimen of equivalent thickness |
| --- | --- | --- | --- |
| uncoated 4340 Steel | 43,000 | 1.00 | — |
| 50 μm Cr coated 4340 Steel | 7,000 | 0.16 | 1.00 |
| 50 μm Co—2P coating (grain size: 15 nm, internal stress: +15 ksi) | 43,500 | 1.01 | 6.21 |
| 75 μm Cr coated 4340 Steel | 6,500 | 0.15 | — |
| 75 μm Co—2P coating (grain size: 15 nm, internal stress: +15 ksi) | 55,000 | 1.28 | 8.46 |
| 75 μm Co coating (grain size: 15 nm, internal stress: +5 ksi) | 8,700 | 0.20 | 1.34 |
| 75 μm Co—W coating (grain size: 10 nm, internal stress: +18 ksi) | 26,000 | 0.60 | 4.00 |

TABLE 5-continued

Axial Fatigue Performance for Uncoated, Cr and Co-Bearing Coated 4340 Steel.

| | Number of Fatigue Life Cycles to Failure at an Applied Stress of 1035 MPa (=150 ksi) Using Axial Fatigue ASTM E466 | Ratio between the number of cycles of the test specimen versus the uncoated test specimen | Ratio between the number of cycles of the test specimen versus the Cr coated test specimen of equivalent thickness |
|---|---|---|---|
| 75 μm Co—W—BN coating (grain size: 10 nm, internal stress: +15 ksi) | 16,400 | 0.38 | 2.52 |
| 75 μm Co—9P coating (amorphous, internal stress: −4 ksi) | 15,800 | 0.37 | 2.43 |
| 75 μm Co—9P-diamond coating (amorphous, internal stress: −4 ksi) | 34,300 | 0.80 | 5.28 |
| 250 μm Cr coated 4340 Steel | 5,000 | 0.12 | — |
| 250 μm Co—2P coating (grain size: 15 nm, internal stress: +15 ksi) | 125,000 | 2.91 | 25 |

A further enhancement of the fatigue performance was observed when the surface of the substrate was suitably pre-treated and/or post-treated by heat-treating and/or cold working such as peening. Similar results were achieved when the Co bearing coating had a mixed amorphous/crystalline nanostructure, i.e., Co—P with P in the range of 3-5%, or amorphous, i.e., in the case of Co—P with P>5. The addition of other alloying elements such as B, W, Fe and the like and particulates such as diamond, SiC, BN and the like provide similar results.

Hydrophobic Metallic Surfaces:

Articles with exposed metallic Co-bearing surfaces comprising durable, fine-grained and/or amorphous microstructures which, at least in part, are rendered water repellent can be obtained by suitably texturing and/or roughening the surface to increase the contact angle for fluids including water. Preferably the roughening creates a dual microstructure including ultra-fine features ≤100 nm embedded in and overlaid on a surface topography with "macro-surface structures" ≥1 μm, thus reducing the wetting behavior of the metallic surface, reducing corrosion and enabling efficient cleaning and drying.

Surface sites generated with selected processes described herein include shot-peening and etching typically which are inexpensive and yield a somewhat random distribution of surface sites. Regularly spaced and sized primary surface sites of defined shape and uniform size can be created by micromachining (e.g., laser scribing, laser ablation and micro- and nano-machining) or LIGA processes to a preform, followed by deposition of the fine-grained and/or amorphous material into these "mold preforms", followed by removal of the fine-grained and/or amorphous metallic layer from the preform molds. As also indicated, the μm sized recesses can further contain an additional substructure, e.g., sub-μm sized structures as observed in lotus leaves or rose petals. Therefore, determining the average size and linear or areal density of such sites is at times challenging and open to interpretation and serves to guide the person skilled in the art of achieving the desired hydrophobicity. In light of these challenges, for the purpose of this invention, the most suitable method therefore to characterize such surfaces is to measure their contact angle for water at room temperature which was observed to be a reliable and reproducible property.

To achieve a reproducible and comparable surface, the surface used for contact angle measurement was initially ground flat up to 2400 grit SiC paper, rinsed in ethanol, ultrasonically cleaned in ethanol and air dried at room temperature. To eliminate any potential contamination no polishing compounds were employed. Subsequently, the contact angle of the "uniformly flat & smooth surfaces" was measured. In all cases the contact angle was measured by placing multiple 5 μl droplets of deionized water on the flat sample surface and taking a picture with a stereoscope at 15× magnification after properly aligning the camera with the horizontal plane of the sample. Contact angle measurements were taken from the digitally captured images using the Image-pro software in triplicates on both sides of each droplet. In all cases the average of all contact angle measurements is reported.

After the contact angle measurements on the flat & smooth surfaces were completed, the very same surfaces on which the measurements were made were suitably patterned as follows: all samples were shot-peened with a pressure of 87 psi (10 passes) using 180 grit alumina media at a distance of 10 cm, rinsed in ethanol and then ultrasonically cleaned in ethanol and air dried at room temperature. The samples were subsequently etched for 30 min in 5% $HNO_3$ at room temperature. Following the etching, samples were rinsed in deionized water and submerged in suitable neutralizing solution, rinsed and then ultrasonically cleaned in ethanol and air dried at room temperature.

The "roughened/textured surfaces" of the dry samples were then subjected again to the very same contact angle measurement described above.

Coarse-grained Co was procured from McMaster-Carr (Aurora, Ohio, USA) in the form of cold rolled & annealed metal sheet. Fine-grained Co coupons were prepared as described above from a mixed sulfate and chloride bath using consumable anodes. Fine grained Co-2P and amorphous Co-9P were produced from the same bath after addition of various amounts of $H_3PO_3$.

The contact angle measurements and the increase in contact angle for textured surfaces are displayed in Table 6. The data illustrates a dramatic difference in contact angles depending on the microstructure of the metallic material with fine-grained metallic material surprisingly experiencing a significant increase in contact angle when, e.g., suitably shot-peened and etched, while the equivalent coarse-grained materials of the same chemistry do not display a commensurate rise in contact angle.

FIGS. 3 through 6 illustrate water droplets on various metallic surfaces and magnified images of the metal surface topography. Specifically FIG. 3a illustrates a water droplet on patterned coarse-grained Co with a contact angle of 89° whereas FIG. 3b depicts the SEM image of the patterned coarse-grained Co surface. FIG. 4a illustrates a water droplet on patterned fine-grained Co with a contact angle of 144° whereas FIG. 4b depicts the SEM image of the patterned fine-grained Co surface with a contact angle of 144°. FIG. 5a illustrates a water droplet on a patterned fine-grained Co—Al$_2$O$_3$-graphite surface with a contact angle of 148° whereas FIG. 5a depicts the SEM image of the patterned fine-grained-Co—Al$_2$O$_3$-graphite metal matrix composite surface. FIG. 6a illustrates a water droplet on a patterned amorphous Co-9P surface with a contact angle of 132° whereas FIG. 6b depicts the SEM image of the patterned amorphous Co-9P surface.

The majority of the fine-grained and amorphous samples showed a high adhesive force between the water droplet and the patterned surface, similar to the behavior observed with rose petals, whereas others, including the fine-grained Co metal matrix composites exhibited the lotus leaf effect allowing the water to roll off at a very low tilt angle.

TABLE 6

Contact angle for various flat and textured metallic surfaces of various compositions and microstructures.

|  | Contact angle on smooth metal surface [degrees] | Contact angle on patterned metal surface [degrees] | Contact Angle change [degrees] |
|---|---|---|---|
| Prior art coarse-grained Co (average grain size 15 micron) | 89 | 87 | −2 |
| Fine-grained Co (average grain size 15 nm) | 68 | 144 | +76 |
| Fine-grained Co2P (average grain size 15 nm) | 83 | 148 | +65 |
| Fine-grained heat treated at 350° C. for 5 hrs Co2P (average grain size 15 nm) | 86 | 123 | +37 |
| Fine-grained Co—Al$_2$O$_3$-graphite Metal-Matrix-Composite (average grain size 15 nm) | 62 | 148 | +76 |
| Amorphous Co—9P | 85 | 132 | +47 |

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. An article comprising:
(i) an electrodeposited metallic material comprising Co in the range of about 75 to 100% by weight, W in the range of 0 to 25% per weight, P in the range of about 0 to 25% per weight and boron in the range of between 0 and 10% per weight, and having a microstructure which is fine-grained with an average grain size between 2 and 5,000 nm and/or an amorphous microstructure;
(ii) said metallic material forming at least part of an exposed surface of said article;
(iii) said metallic material having an inherent contact angle for water of less than 90 degrees at room temperature when measured on a smooth exposed surface portion of said metallic material which has a maximum surface roughness Ra of 0.25 microns; and
(iv) said metallic material having an exposed patterned surface portion having surface structures having a height of between at least 5 microns to 1000 microns incorporated therein to increase the contact angle for water at room temperature of said exposed patterned metallic material surface portion to over 100 degrees.

2. The article according to claim 1, wherein the contact angle of said metallic material having the exposed surface structures is increased to over 105 degrees.

3. The article according to claim 1, wherein the contact angle of said metallic material having the exposed surface structures is increased to over 110 degrees.

4. The article according to claim 1, wherein the exposed surface of said metallic material is rendered hydrophobic without the addition of additional hydrophobic materials or coatings to the exposed surface.

5. An article comprising:
(i) an electrodeposited metallic material comprising Co in the range of about 75 to 100% by weight, W in the range of 0 to 25% per weight, P in the range of about 0 to 25% per weight and boron in the range of between 0 and 10% per weight, and forming at least part of a surface layer of said article having an amorphous microstructure;
(ii) said metallic material at room temperature having a contact angle for water of less than 90 degrees when measured on an exposed smooth surface portion of said metallic material having a maximum surface roughness Ra of 0.25 microns; and
(iii) an exposed patterned surface portion of said metallic material has surface structures having a height of at least 5 microns to 1000 microns embedded therein to raise the contact angle for deionized water at room temperature in said exposed patterned metallic material surface portion by at least 40 degrees.

6. The article according to claims 1 or 5, wherein the surface structures of said exposed patterned surface portion of said metallic material are macro-surface structures, the macro-surface structures being overlaid with nano-structured features having a maximum height of 100 nm, the macro-surface structures being selected from the group consisting of elevations, depressions, recesses, pits, crevices, cavities, pitted surface structures; and grooved, roughened and etched surface structures.

7. The article according to claim 6, wherein the macro-surface structures have a population in the range of 5 to 1,000 per mm, said macro-surface structures having a diameter and spacing range of each between 5 μm and 1000 μm.

8. An article comprising:
an inherently hydrophilic electrodeposited metallic material comprising Co in the range of about 75 to 100% by weight, W in the range of 0 to 25% per weight, P in the range of about 0 to 25% per weight and boron in the range of between 0 and 10% per weight, and including a metallic layer having a thickness of at least 10 microns forming at least part of an exposed surface of the article and having at least one of a microstructure which is fine-grained with an average grain size between 2 and 5,000 nm and an amorphous microstructure, and
said metallic material layer having an inherently hydrophilic exposed surface having a maximum surface roughness Ra of 0.25 microns, at least a portion of the exposed surface is a patterned surface portion having surface structures incorporated therein to increase the contact angle for deionized water at room temperature to over 110 degrees and render the inherently hydrophilic exposed surface of said metallic material layer hydrophobic,
wherein the exposed patterned surface portion of said metallic material layer is formed into a dual surface structure comprising macro-surface structures having a height of at least 5 microns to 1000 microns overlaid with nano-structured features having a height of less than 100 nm rendering the exposed patterned surface portion of said metallic material layer hydrophobic without modifying the exposed surface of said metallic material layer with additional hydrophobic materials.

9. The article according to claims 1, 5 or 8, wherein said electrodeposited metallic material comprising Co has a ductility in the range of 0.1 to 35%.

10. A method for manufacturing an article having a hydrophobic metallic surface layer having a thickness of at least 10 microns covering a surface of the article comprising:
providing an inherently hydrophilic electrodeposited metallic material layer comprising Co in the range of about 75 to 100% by weight, W in the range of 0 to 25% per weight, P in the range of about 0 to 25% per weight and boron in the range of between 0 and 10% per weight, and having at least one of a microstructure which is fine-grained with an average grain size between 2 and 5,000 nm and an amorphous microstructure, and having an exposed surface having a maximum surface roughness Ra of 0.25 microns;
incorporating surface structures into at least a portion of the exposed surface of said hydrophilic metallic material layer to render said portion of the exposed surface of said metallic material layer hydrophobic and increase the contact angle for deionized water in the exposed surface of said metallic material layer having the structured portion to equal to or greater than 110 degrees at room temperature by treating the hydrophilic metallic material layer by shot-peening followed by etching; and
forming the exposed surface of said metallic material layer having the structured portion into a dual surface structure comprising macro-surface structures having a height of at least 5 microns to 1000 microns overlaid with nano-structured features having a height of less than 100 nm.

11. The method according to claim 10, wherein said electrodeposited metallic material comprising Co has a ductility in the range of 0.1 to 35%.

* * * * *